United States Patent [19]
Anderson

[11] 4,363,687
[45] Dec. 14, 1982

[54] METHOD FOR MAKING LARGE FIBERGLASS STRUCTURES

[76] Inventor: Stephen W. Anderson, 1441 S. Monaco Street Pkwy., Denver, Colo. 80224

[21] Appl. No.: 252,996

[22] Filed: Apr. 10, 1981

Related U.S. Application Data

[62] Division of Ser. No. 866,013, Dec. 30, 1977, Pat. No. 4,278,411.

[51] Int. Cl.³ .......................... B29C 5/02; B29C 5/04; B29C 27/26; B29D 3/02
[52] U.S. Cl. ................................. 156/245; 156/158; 156/289; 156/304.2; 264/250; 264/257; 264/258; 264/261; 264/263; 264/267; 264/309; 264/310
[58] Field of Search ............... 264/248, 257, 258, 267, 264/261, 263, 309, 310, 338, 250; 156/245, 158, 304.1, 304.2, 304.3, 289; 118/DIG. 10, 304, 305, 317; 134/123, 159; 425/90, 435

[56] References Cited

U.S. PATENT DOCUMENTS

| Re. 25,587 | 6/1964 | Wiltshire | 264/114 |
|---|---|---|---|
| 2,513,289 | 7/1950 | Crom | 264/270 |
| 2,790,997 | 5/1957 | Kurtz | 425/435 |
| 2,945,531 | 7/1960 | Balcom et al. | 156/423 |
| 2,979,798 | 4/1961 | Price | 425/60 |
| 3,003,188 | 10/1961 | Weiss | 264/308 |
| 3,150,219 | 9/1964 | Schmidt | 264/258 |
| 3,301,925 | 1/1967 | Engel | 264/37 |
| 3,381,744 | 5/1968 | Taccone | 164/295 |
| 3,561,059 | 2/1971 | Guldenfels | 425/120 |
| 3,679,337 | 7/1972 | Fuselier | 425/130 |
| 3,689,191 | 9/1972 | Westbrook et al. | 425/429 |
| 3,732,044 | 5/1973 | Borcoman | 425/111 |
| 3,744,951 | 7/1973 | Szatkowski | 425/259 |
| 3,783,060 | 1/1974 | Goldsworthy et al. | 156/69 |
| 3,822,980 | 7/1974 | Graeper | 425/429 |
| 3,914,105 | 10/1975 | Pivar | 425/435 |
| 3,957,410 | 5/1976 | Goldsworthy et al. | 425/183 |
| 3,996,322 | 12/1976 | Snelling et al. | 264/45.7 |
| 4,106,516 | 8/1978 | Wiegand | 134/123 |

FOREIGN PATENT DOCUMENTS

49-43711 11/1974 Japan ................... 156/304.2

Primary Examiner—Willard E. Hoag
Attorney, Agent, or Firm—Saidman, Sterne & Kessler

[57] ABSTRACT

A completely self-contained apparatus and associated technique for the manufacture of large fiberglass structures. In a preferred embodiment, the system is designed to manufacture large fiberglass storage tanks for liquids, and is self-contained from the point of view that the machine is capable of performing all manufacturing steps without any auxiliary equipment and may be set up virtually anywhere that can provide a source of electricity and air. The main components of the machine include an operator's carriage which is cantilevered from a rear frame so as to enable same to be inserted into the open end of a large, substantially cylindrical revolving mold having a closed, substantially hemispherical end portion. The carriage includes an overhead canopy for the protection of the operator, as well as fresh air intake and exhaust fans to provide adequate ventilation for the operator. A raw material applicator is positioned in the forward portion of the carriage and is designed to apply the appropriate proportions of chopped fiberglass roving, resin and catalyst to the inner surface of the mold as the carriage reciprocates therein.

14 Claims, 24 Drawing Figures

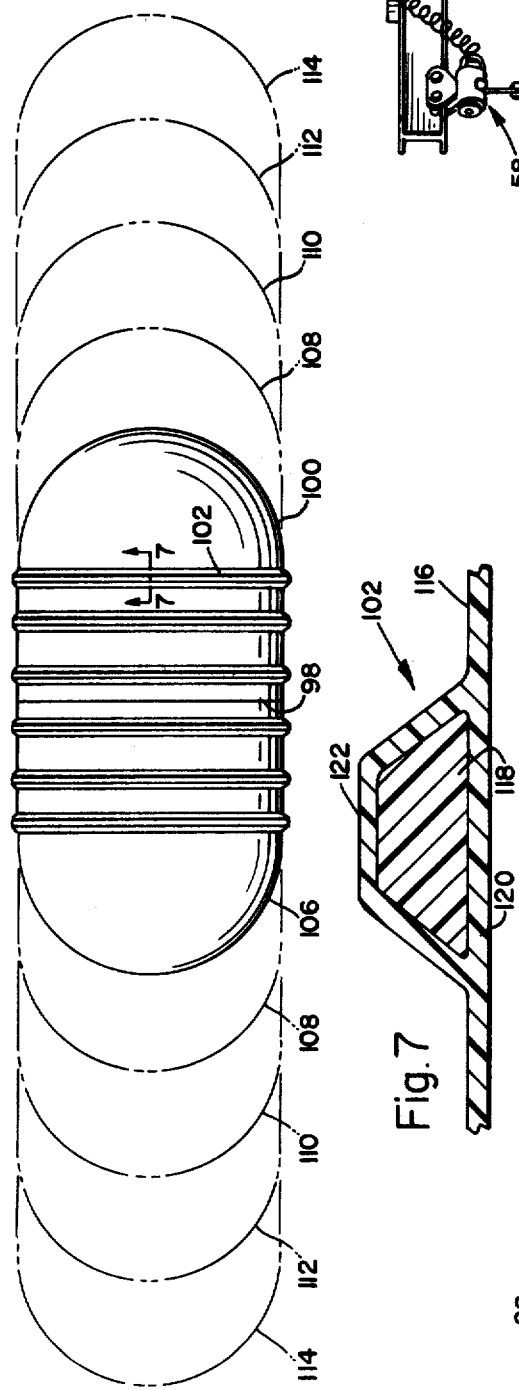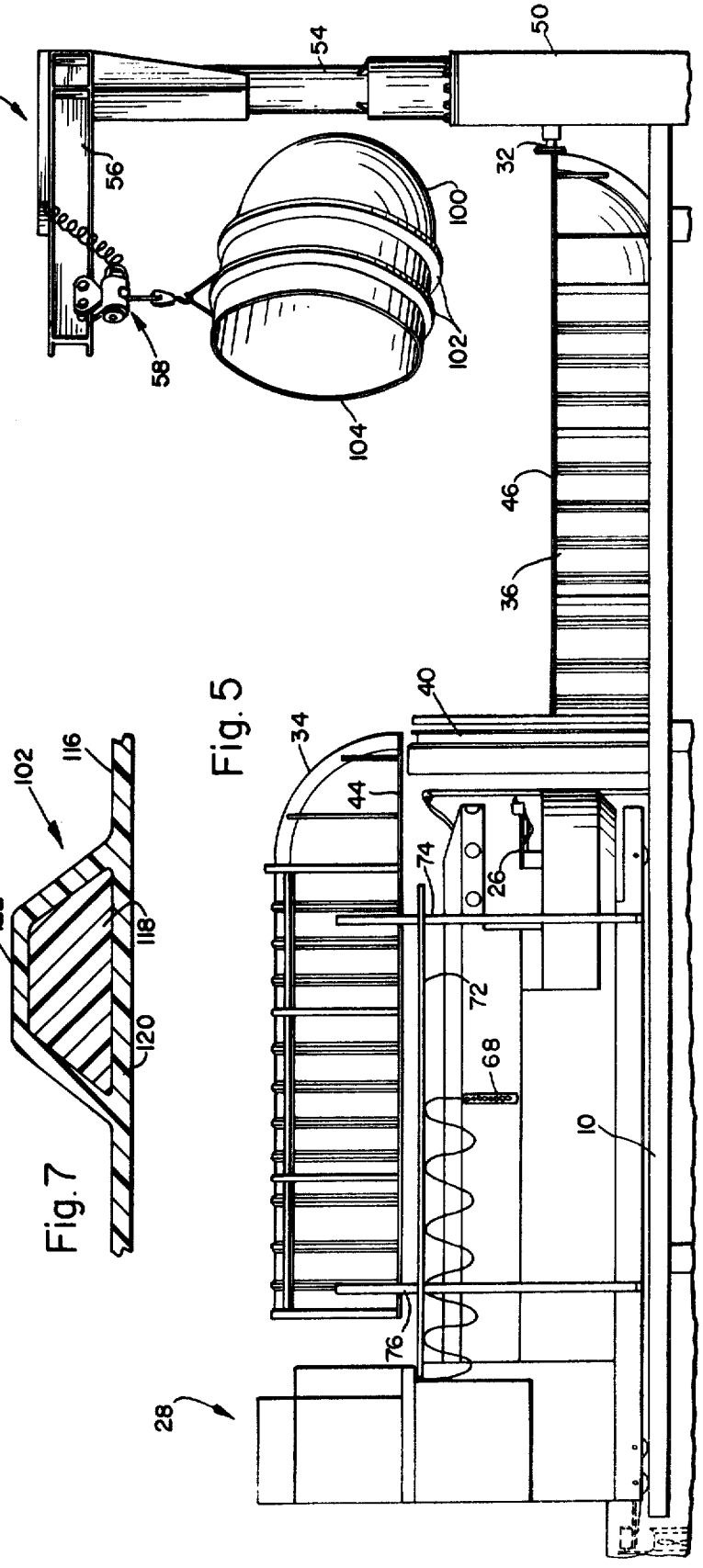

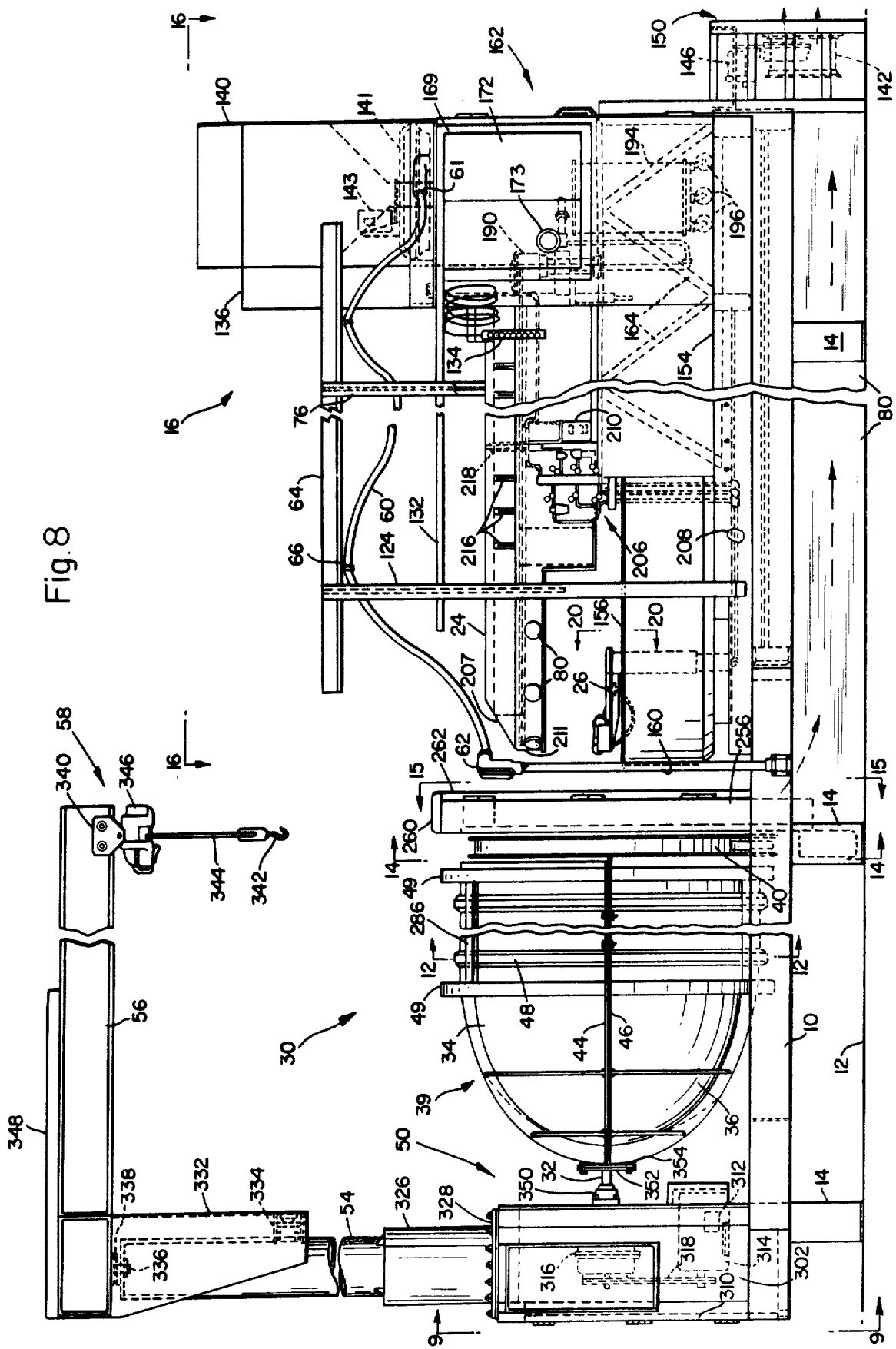

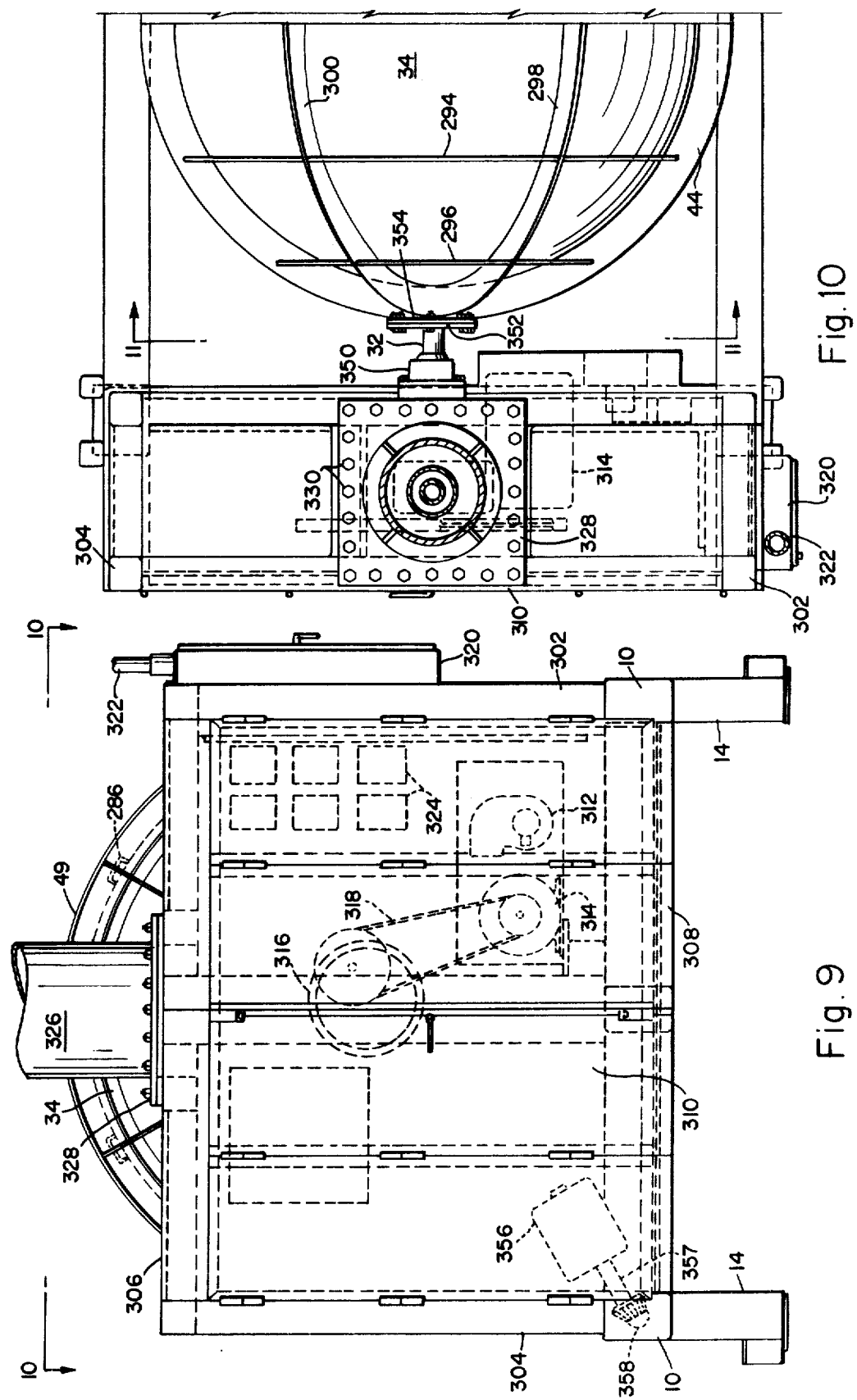

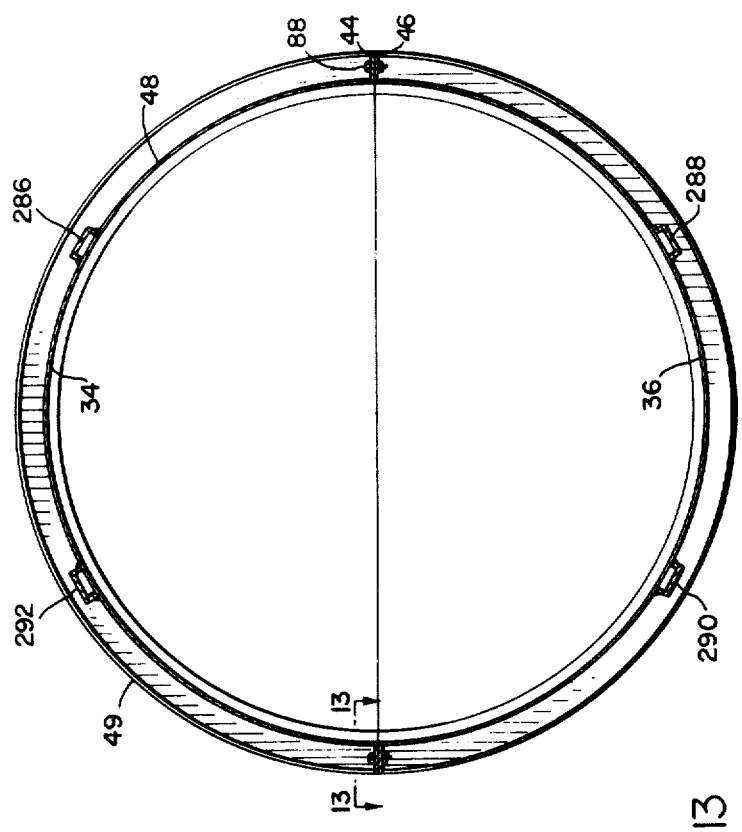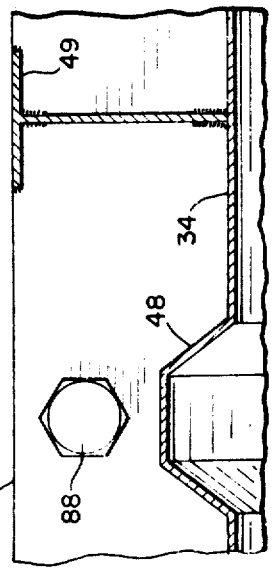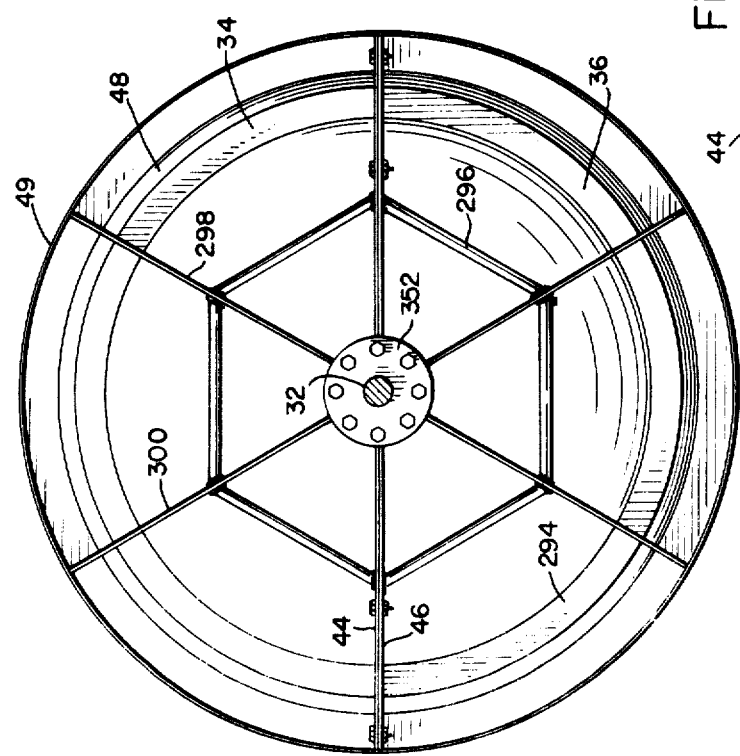

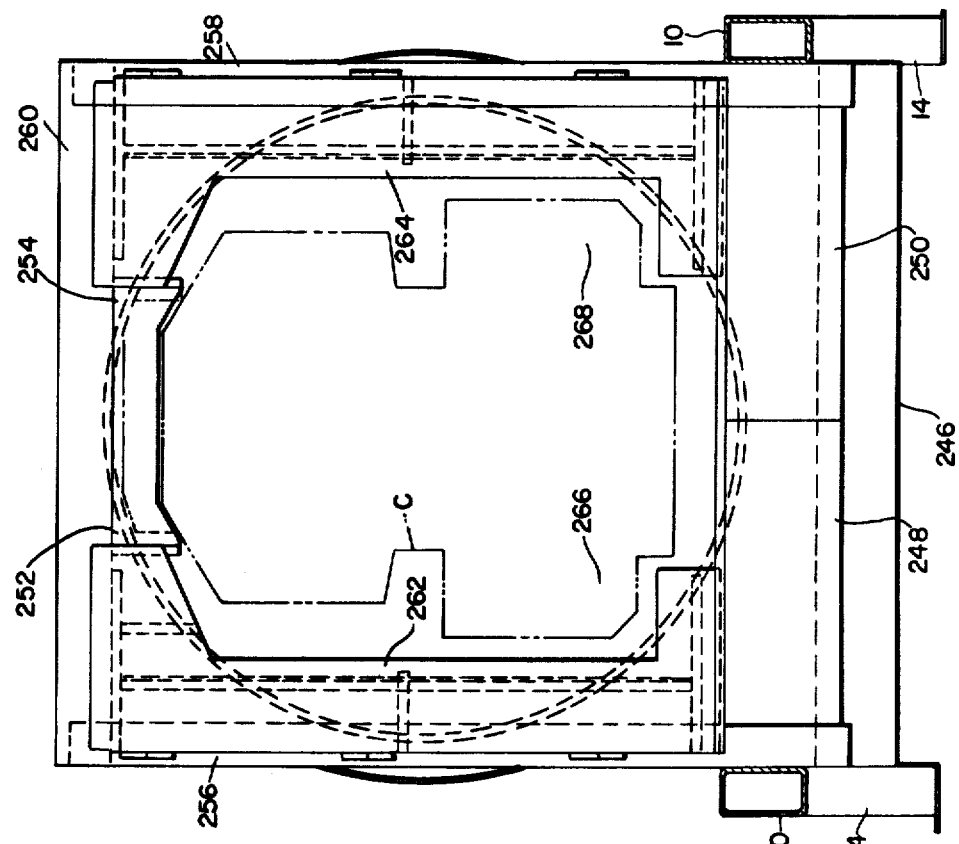
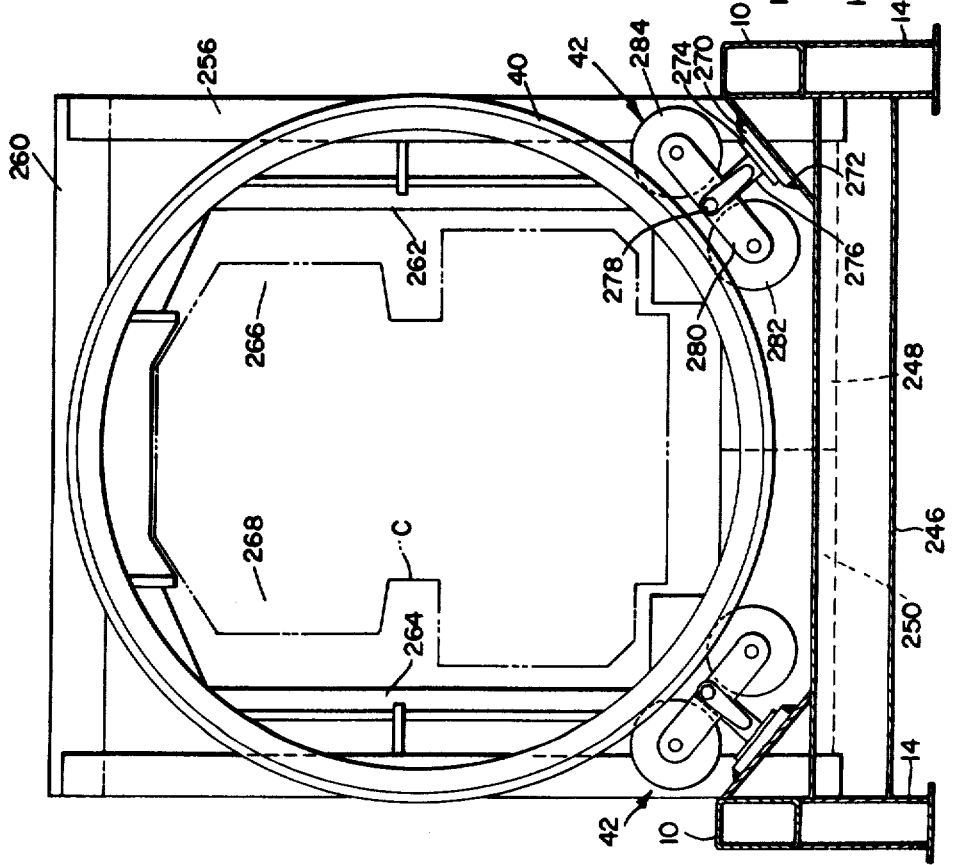

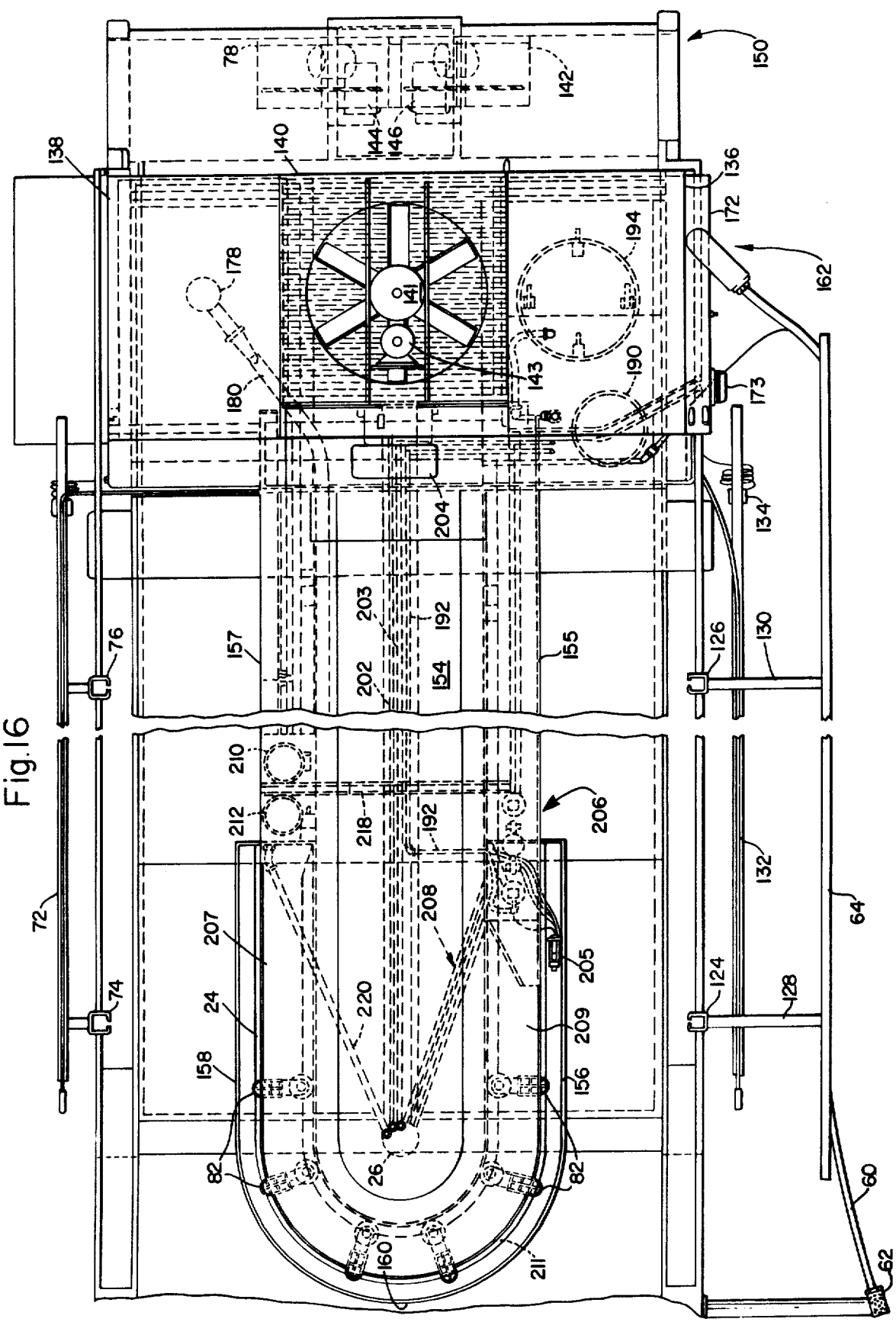

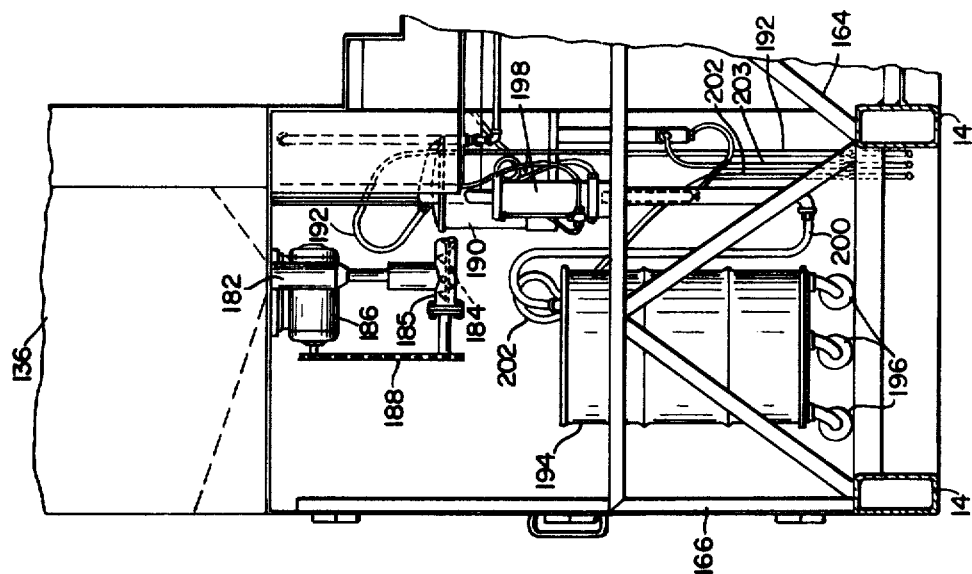
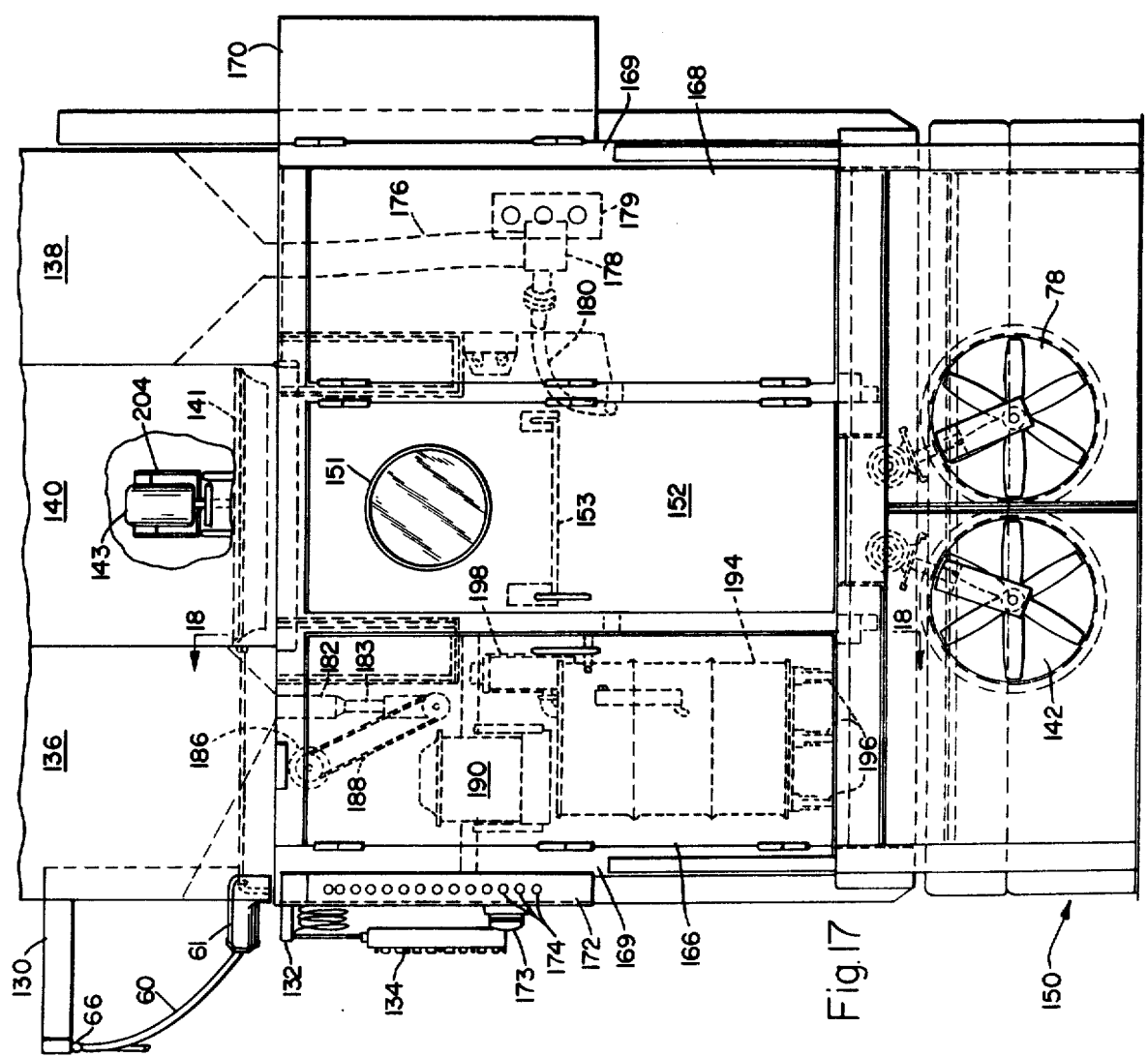
Fig. 18
Fig. 17

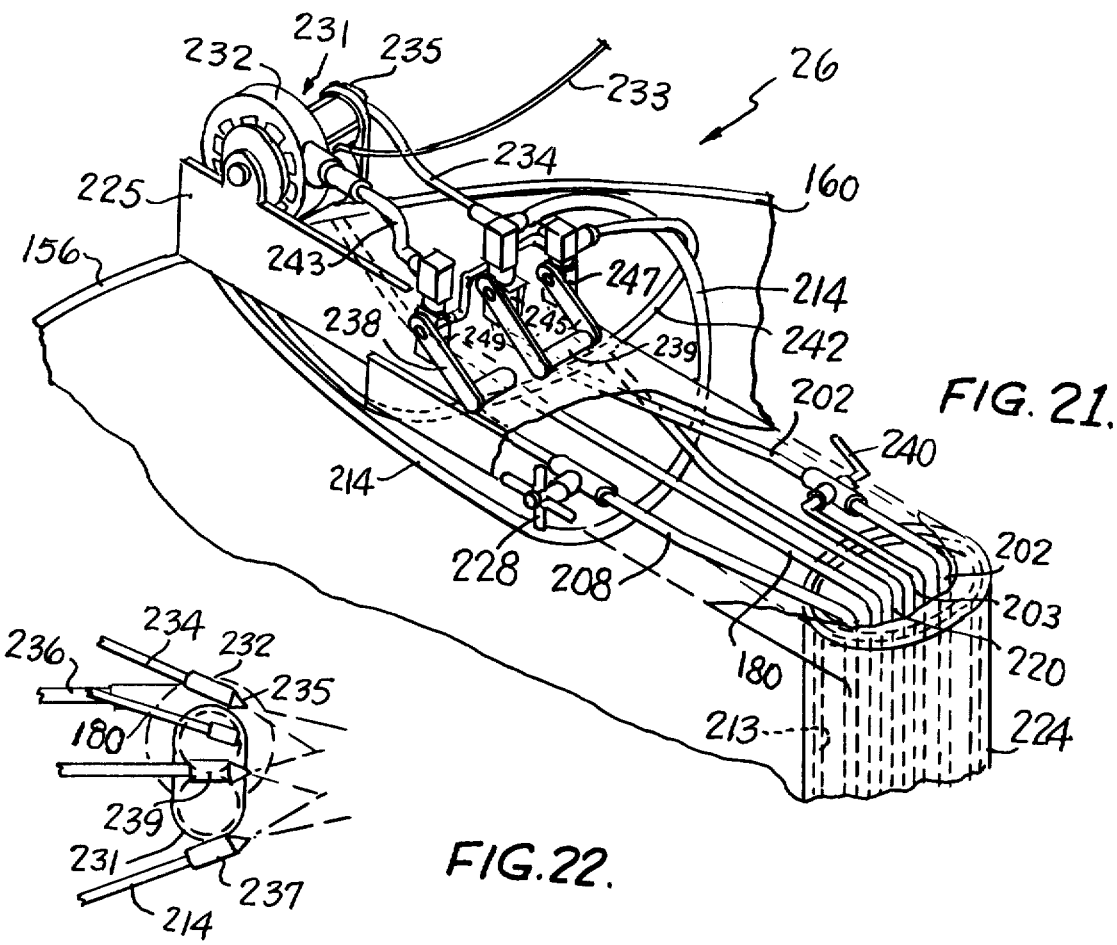
FIG. 21.
FIG. 22.
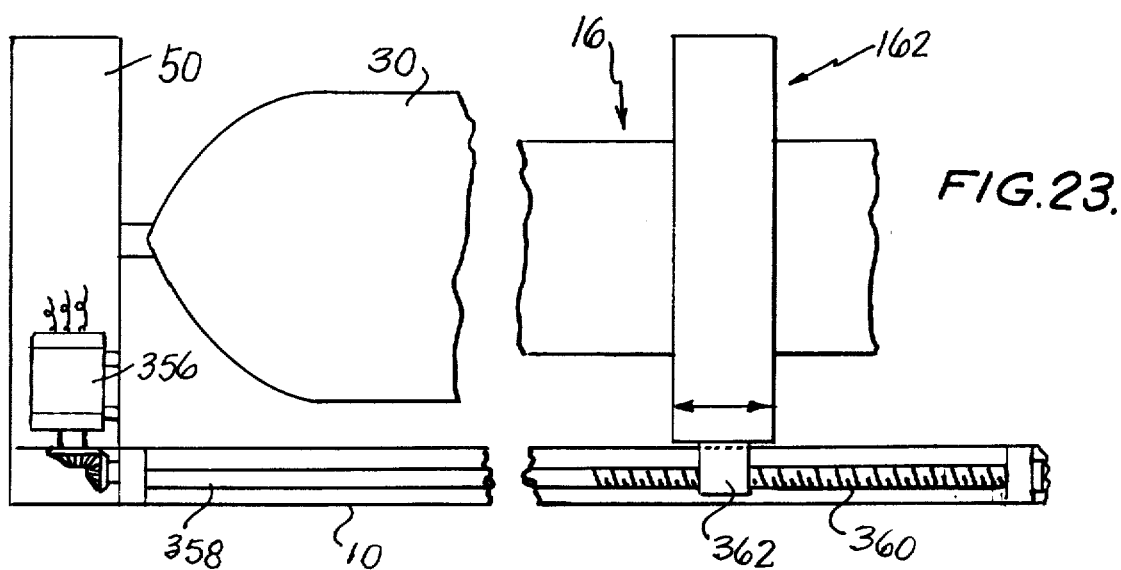
FIG. 23.

METHOD FOR MAKING LARGE FIBERGLASS STRUCTURES

This is a division of Application Ser. No. 866,013, filed Dec. 30, 1977 now U.S. Pat. No. 4,278,411.

BACKGROUND OF THE INVENTION

1. Field of the Invention

The present invention is related to the manufacture of fiberglass structures and, more particularly, is directed towards a novel method and apparatus which facilitates the manufacture of large, fiberglass structures and permits same to be accomplished with total operator safety.

2. Description of the Prior Art

Fiberglass tanks are presently widely used for the storage of liquids. In particular, extremely large fiberglass tanks, ranging in capacity from 2,000 to 12,000 gallons, are extremely popular in the underground storage of inflammable liquids, such as gasoline. Such tanks are commonly utilized in, for example, retail gasoline stations. It is important that such tanks be leak-proof, strong, corrosive resistant, and enable storage or large amounts of gasoline.

While the utilization of such large, underground fiberglass tanks has become extremely popular over the last twenty years or so, the technique for manufacturing such tanks has not progressed much beyond the initial, labor-intensive techniques first developed when the market for such tanks initially arose. Basically, the common manufacturing technique, still in use today, centers about the use of a smooth, revolving cylindrical mandrel of approximately eight feet in diameter. A workman is positioned adjacent the revolving mandrel and is equipped with a portable raw material applicator known in the art as a chopper gun. A chopper gun includes means for chopping fiberglass roving into small (1"-2") strands, a resin spray nozzle and a catalyst spray nozzle. The workman basically sprays the mixture onto the outside surface of the mandrel to form a smooth cylindrical, eight-foot diameter drum. Ribs are then physically placed about the circumference of the drum to provide added structural strength for the finished product. Such ribs are spaced along the entire length of the drum and normally consist of cardboard spacers and/or a lightweight plastic filler. Another layer of continuous woven roving is then bonded with the resin and catalyst onto the outer shell of the drum to secure the ribs and provide additional strength.

The hemispherical end caps for the cylindrical drum are generally formed in separate, horizontally positioned molds, and are again applied by hand-held chopper guns. Each end cap must then be bonded onto each end of the drum by hand using fiberglass mats, woven roving and resin. There frequently arises either fitting or bonding problems between the caps and the cylindrical drum, as a result of the inability to control the wall thickness of each product with any precision.

Problems with the technique described above revolve both around the finished product and the safety of the workmen. The finished product, whose dimensions are difficult to control from batch to batch, frequently experiences disjoining of the circumferential ribs. Further, as described above, the separately formed end caps are difficult to handle and install. Quite clearly, the entire process is hand labor intensive and, indeed, is quite messy. The workmen must wear disposable clothes due to the impregnation thereof by the raw materials being sprayed. Although masks are frequently required, they are seldom used. Ventilation is required but is not always adequate, which can result in the intoxication of the workers from the fumes of the raw materials. The admixture of raw materials drips and hardens on the floor and is quite difficult to clean up. Unfortunately, the quality of skilled labor available to perform the above-described technique is very low, as a result of the dangerous and difficult working conditions.

Several attempts have been made to overcome some of the conditions set forth above, but without much overall success. For example, others have used a segmented mold constructed of wood and/or plastic which is balanced on four wheels, one of which is motor driven to cause the mold to rotate. A forklift or similar vehicle has wooden planking attached thereto upon which one or two workmen would be positioned with their hand-held chopper guns. The platform is then positioned inside the mold, and the workmen spray the inside surface of the mold with their chopper guns as the mold rotates. Blower fans are aimed in the general direction of the inside of the mold in an effort to circulate enough air inside the mold to prevent asphyxiation of the workmen. The workmen may even be required to wear a mouthpiece respirator or "gas mask". When the finished product is formed, the mold is unfastened, and the product removed.

This technique, while providing some advantages over the first technique, still is quite dangerous to the workmen, and does not result in an overall uniform end product. For example, the only protection afforded the workmen while spraying inside the mold is their mouthpiece respirators and disposable coveralls. The workmen still find it difficult to breathe. In the event that the mold stops rotating, by virtue of a power outage or the like, prior to the solidifying of the fiberglass or plastic coating, the laminate on the inside wall of the mold could drip down onto the workmen. The working conditions are, to say the least, extremely hazardous. The mold itself, being constructed of wood and plastic, has a relatively short life expectancy, and frequently must be discarded after making one, two or three products. An entirely new mold would then have to be constructed at a considerable cost per product. The wall thickness of the fiberglass tank itself manufactured by such techniques is difficult to control, and the dimensions of the end product basically rely upon the "feel" of the worker.

In sum, the prior art techniques for constructing fiberglass tanks, or other large plastic or fiberglass structures, involve a lot of hand labor, are extremely inefficient, result in non-uniform end products, and are extremely dangerous to the workers.

Prior art U.S. Pat. Nos. of which I am aware which relate to this general area include: 2,513,289; 2,790,997; 2,945,531; 3,003,188; 3,150,219; 3,301,925; 3,381,744; 3,561,059, 3,679,337; 3,689,191; 3,744,951; 3,783,060; 3,822,980; 3,914,105; 3,957,410; 3,996,322; and Re. 25,587.

OBJECTS AND SUMMARY OF THE INVENTION

It is therefore a primary object of the present invention to provide a method and apparatus for manufacturing large fiberglass structures which overcome all of the disadvantages noted above with respect to prior art techniques.

Another object of the present invention is to provide a machine for making large fiberglass tanks and other structures which is completely self-contained in requiring only a source of electricity and air for operation.

A further object of the present invention is to provide a method and apparatus for constructing large fiberglass tanks which permits the operator of the machine to work in maximum safety by minimizing exposure to intoxicating fumes, particulate matter, and the like.

An additional object of the present invention is to provide a fiberglass tank making machine and technique which protects the physical well-being of the worker by providing physical barriers to the raw materials being applied, adequate ventilation and lighting, and which facilitates operation by providing tools and controls in fingertip reach in such a fashion so as to enable the workmen to store, handle and apply the raw materials safely, easily, and without requiring extensive cleanup.

A further object of the present invention is to provide a unique fiberglass tank manufacturing process which permits the interior wall thickness of the tank to be predetermined in accordance with controllable variables.

A further object of the present invention is to provide a novel machine for making fiberglass tanks and other large plastic or fiberglass structures which permits the admixture of light or heavy aggregates as needed into the finished product.

A still further object of the present invention is to provide a technique and apparatus for making large fiberglass tanks which provides a machine including a mold which has an infinite lifetime, and therefore need not be replaced but for a change in shape of the product being manufactured.

A still further object of the present invention is to provide a method and apparatus for making fiberglass tanks which maximizes the safety of the worker and simultaneously minimizes manual labor.

An additional object of the present invention is to provide a machine for making large fiberglass structures, such as underground liquid storage tanks, which is completely self-contained in that all raw materials, power, molds, applicator devices, motors, auxiliary systems, hoisting devices, and the like, are provided.

The foregoing and other objects are attained in accordance with one aspect of the present invention through the provision of apparatus for making a large fiberglass structure, which comprises a mold having an open end, carriage means for accommodating an operator and which includes means for applying raw materials to the interior surface of the mold, means for selectively reciprocating the carriage means into and out of the mold, and means for rotating the mold. The mold includes a substantially cylindrical side wall and a hemispherical end portion opposite the open end. The carriage means preferably comprises an elongated carriage of approximately the same length as that of said mold and having the means for applying raw materials positioned near the front portion thereof to enable same to cover the entire interior surface of the mold as the carriage is reciprocated therein. The elongated carriage preferably includes an entrance door positioned near the rear portion thereof, a walkway leading from the rear portion to the front portion, and a canopy positioned over the entire length of the walkway to provide protection for the workmen positioned therebelow. The carriage includes cantilevered means extending from the rear portion thereof to the front portion for supporting the latter as the carriage is moved into the mold.

In accordance with other aspects of the present invention, means are further included for exhausting air from the carriage means and the mold which, in a preferred embodiment, comprises a pair of fans positioned below the rear portion of the carriage means which draw air through an exhaust duct which extends underneath the carriage. The carriage also preferably includes means for storing the raw materials thereon so as to move therewith. More particularly, stored on the carriage are at least a pallet of fiberglass roving, a plurality of resin-containing tanks, preferably heated, and a plurality of pressurized catalyst-containing tanks. Means connect the resin-containing tanks and catalyst-containing tanks to the raw material applying means positioned at the front portion of the carriage. The fiberglass roving is fed overhead through roving eyes to the front portion of the carriage. A mold release agent is also stored in the carriage and may be applied to the interior of the tank via a spray gun.

In accordance with other aspects of the present invention, the means for applying raw materials comprises a turret post which is affixed to the floor of the carriage near the front portion thereof. To the top of the turret post is pivotally mounted a support bracket for movement in a horizontal plane. Positioned on the end of the bracket are means for spraying the resin, catalyst and chopped fiberglass roving, as well as a light or heavy aggregate filler. The conduit means which connect the remotely located resin tanks, catalyst tanks, and the like preferably extend underneath the carriage and up through the turret post to the support bracket. While the cylindrical side wall of the mold is being sprayed, the support bracket is fixed substantially perpendicularly to the direction of travel of the carriage, whereas the support bracket may be pivoted when the hemispherical end wall of the mold is being sprayed.

The operator's area surrounding the turret post is enclosed by a side wall which rises above the floor to approximately waist level, leaving an open spraying zone between the top edge of the side wall and the overhead canopy through which the raw materials are sprayed from the chopper gun and resin and catalyst sprayers. In accordance with other aspect of the present invention, means are preferably provided for forming a vertical air curtain between the operator's area and the spray zone for providing further protection for the operator from the noxious fumes and particulates. The means for forming the air curtain comprises a high pressure fan positioned on the top of the rear portion of the carriage which is connected via side ducts to a narrow, elongated aperture formed in the forward portion of the canopy for directing the air downwardly. The canopy preferably further includes light sources positioned therein for illuminating the interior of the mold. A low pressure air intake fan is also preferably provided on the top of the rear portion of the carriage for drawing in fresh air to the operator's area from outside the carriage. In combination with the exhaust fans, the air intake fan and air curtain fan provide constant recirculating fresh air and protection for the operator to an extent heretofore unmatched.

The cylindrical and hemispherical mold of the present invention is preferably split longitudinally so as to form an upper half and a lower half which may be provided with means for easily connecting and disconnecting the two mold halves to one another. A unique feature of the present invention provides means for hoisting the upper half of the mold which are positioned on both sides of the carriage so as to move therewith and which remain positioned externally of the mold while the carriage is inside the mold. The hoisting means may, for example, comprise two pair of vertical posts positioned on the outside of both sides of the mold, each of the posts having power-driven means adapted to be connected to the upper half of the mold for raising same when desired. The power-driven means may be electric or hydraulic, as desired. The means for rotating the mold is coupled only to the lower half of the mold so as to permit the upper half to be hoisted. More particularly, the means for rotating the mold comprises a motor driven shaft aligned coaxially with respect to the longitudinal axis of the mold and which is connected to the hemispherical cap portion of the lower mold half.

The carriage means and the mold are movably positioned on an elongated frame structure, and means are attached to the approximate midpoint of the frame near the open end of the mold for supporting the latter during rotation thereof. More particularly, the mold supporting means comprises a circular support ring which extends peripherally about the open end of the mold, and a pair of wheel support assemblies connected to the frame structure and having wheels for engaging the circular support ring. Each of the wheel support assemblies more particularly comprises a center pivot bracket oriented at about 45° with respect to a vertical plane through the center line of the mold, a bearing mounting plate transversely and pivotally mounted to one end of the center pivot bracket, and a pair of wheels which are mounted on each end of the bearing mounting plate.

In accordance with still other aspects of the present invention, means are provided at the closed end of the mold for housing the means for rotating the mold as well as the means for selectively reciprocating the carriage. The drive motor housing also serves as a means for supporting means for removing the finished product from the mold. In a preferred form, the removing means comprising a gantry crane having a main post which extends upwardly from the housing means, a horizontal support which is pivotally mounted to the top of the main post, and a motor driven crane which is adapted for reciprocal movement along the horizontal support.

Other features of the present invention include the provision of infrared heaters pivotally mounted to the motor housing for permitting the mold to be pre-heated, a catwalk and railing secured to each side of the frame structure along the entire length of the carriage and the mold to permit workmen to safely walk alongside, and a pair of control panels, one positioned inside the carriage, one positioned exteriorally thereof, which contain all controls necessary to operate the machine.

The present invention also contemplates a method of making a large fiberglass structure, which comprises the steps of passing a covered operator's carriage into and out of a mold having an open end and a closed end, applying raw materials including resin and glass fibers to the inside surface of the mold during certain passages of the carriage therethrough, and manually controlling certain operations of the carriage from inside the carriage. The method further contemplates the steps of affixing means for applying raw materials to the front end of the covered operator's carriage so as to enable movement thereof in a horizontal plane, and rotating the mold about its longitudinal axis while the raw materials are being applied. A mold release agent is sprayed on the inner surface of the mold during the first pass of the carriage therein, while a mixture of resin, catalyst and chopped fiberglass roving are sprayed on the inner surface of the mold during the first withdrawal of the carriage therefrom.

The technique of the present invention further contemplates the step of spraying a light aggregate material into a plurality of ribs formed in the mold during the second pass of the carriage therein, and spraying a mixture of resin, catalyst and chopped fiberglass roving on the inner surface of the mold during the second withdrawal of the carriage therefrom so as to cover the light aggregate. On the third pass of the carriage into the mold, a resin-rich coating is preferably sprayed on the inner surface, whereafter the mold is rotated with the carriage fully inserted therein until the raw materials are sufficiently hardened. Then, the upper half of the mold is separated from its lower half, and the upper half is hoisted on top of the carriage. The carriage is then withdrawn from the lower half of the mold with the upper half hoisted thereover. The finished article is then removed from the lower half of the mold by the gantry crane. The carriage is then reinserted into the lower mold half, and the upper mold half is lowered back down into engagement with the lower mold half, whereupon the upper and lower mold halves are resecured together. The foregoing procedure produces one-half of a fiberglass tank, and the steps set forth above are essentially repeated to form the other tank half which are then joined at their open ends to form a substantially enclosed, large fiberglass tank.

The present technique also contemplates the steps of circulating fresh air into the covered operator's carriage while fumes are exhausted from the mold. A substantially vertical, high pressure air curtain is also established around the operator's station in the forward portion of the covered operator's carriage to provide further protection for the operator against the intoxicating fumes and particulate matter.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 5 is a view of the apparatus of the present invention which is sequential to that illustrated in FIG. 4, showing the carriage in its fully retracted position and the gantry crane lifting the finished product from the lower mold half;

FIG. 6 is a side view illustrating the various sizes of the finished product which may be formed by the machine of the present invention;

FIG. 7 is a cross-sectional view taken along line 7—7 of FIG. 6;

FIG. 8 is an enlarged, partially broken view of the preferred embodiment of the present invention viewed from the side opposite to that illustrated in FIG. 1 and which illustrates some of the internal components of the carriage, mold and motor house in dotted outline;

FIG. 9 is an end view of the motor house illustrated in FIG. 8 and taken along line 9—9 thereof;

FIG. 10 is a top, sectional view of the motor house and mold end illustrated in FIG. 8 and taken along line 10—10 of FIG. 9;

FIG. 11 is a cross-sectional view of the hemispherical mold end illustrated in FIG. 10 and taken along line 11—11 thereof;

FIG. 12 is a cross-sectional view of the cylindrical side wall portion of the mold of FIG. 8 and taken along line 12—12 thereof;

FIG. 13 is a sectional view showing the construction details of the cylindrical portion of the mold and taken along line 13—13 of FIG. 12;

FIG. 14 is another cross-sectional view of the mold illustrated in FIG. 8 which more particularly shows the support means therefor which is taken along line 14—14 of FIG. 8;

FIG. 15 is an end view of the mold of FIG. 8 showing the mold entranceway which is taken along line 15—15 of FIG. 8;

FIG. 16 is a top view of the carriage and associated structure which is taken along line 16—16 of FIG. 8;

FIG. 17 is an end view of the carriage of FIG. 8;

FIG. 18 is a sectional view showing some of the internal components of the rear portion of the carriage illustrated in FIG. 17 and taken along line 18—18 thereof;

FIG. 21 is another perspective, partially broken view illustrating the details of the turret assembly for applying the raw materials in accordance with the principles of the present invention;

FIG. 22 is a side schematic illustration of the spray gun apparatus illustrated in FIG. 21;

FIG. 23 is a side, partially schematic, partially broken view of one preferred mode of moving the carriage of the present invention.

DETAILED DESCRIPTION OF THE PREFERRED EMBODIMENTS

Figure 1:
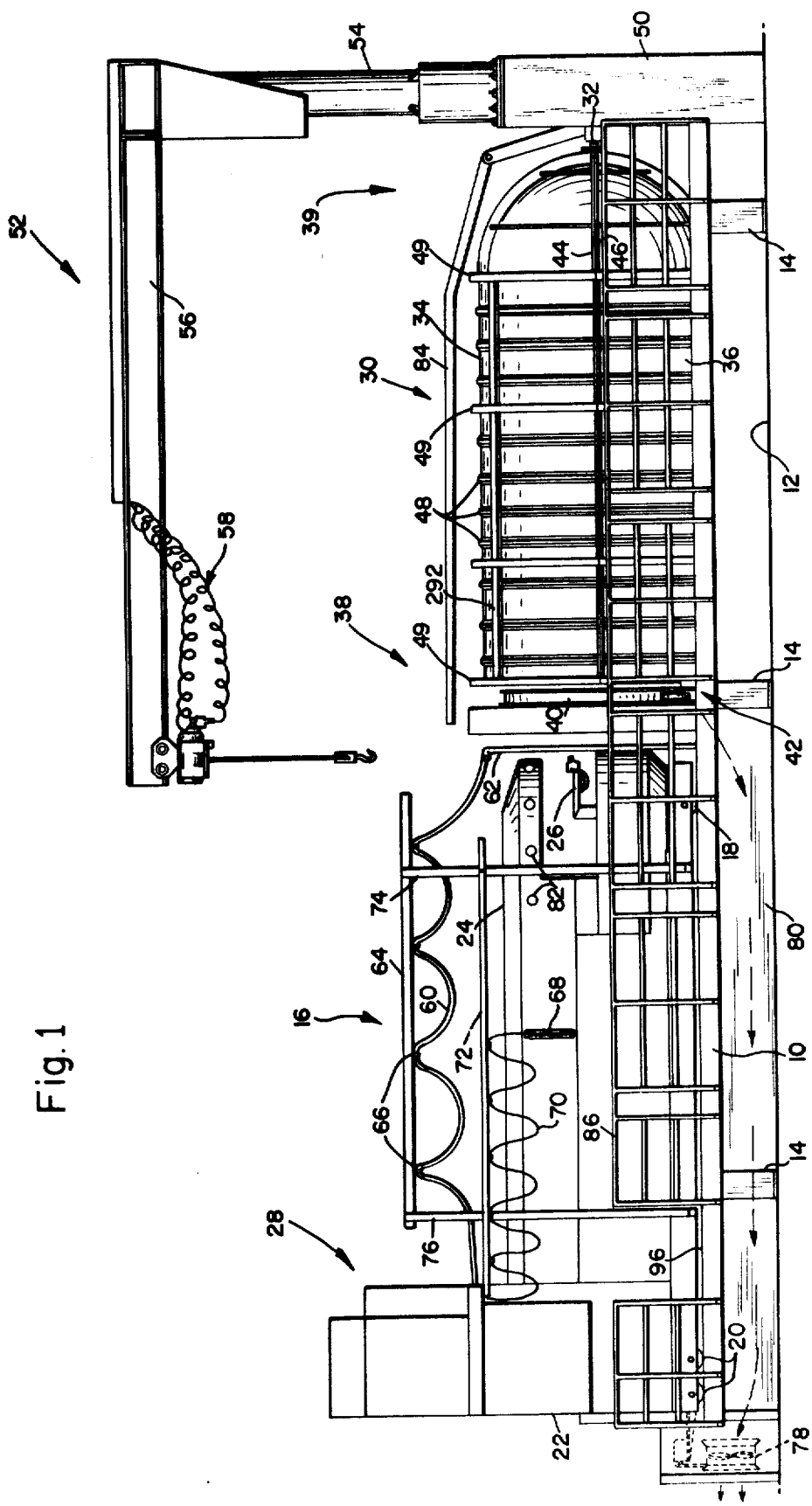
FIG. 1 is a side view in elevation which illustrates the basic components which comprise a preferred embodiment of a machine for making large fiberglass tanks in accordance with the present invention.

Referring now to the drawings, wherein like reference numerals represent identical or corresponding parts throughout the several views, and more particularly to FIG. 1, there is illustrated a side view of the main components which comprise a preferred embodiment of the present invention in the form of a machine for making large fiberglass tanks. Although the preferred embodiment of the method and apparatus of the present invention will be described in connection with the manufacture of large, enclosed liquid fiberglass storage tanks, it will be understood by a person of ordinary skill in the art that many other large structures, such as domes, skylights, and the like, may be constructed in the accordance with the principles and apparatus of the present invention.

The preferred embodiment illustrated in FIG. 1 includes a main frame 10 which extends the entire length of the machine and which is elevated from the floor 12 by a plurality of spaced cross-support members 14.

Mounted for movement along the direction of main frame 10 is an operator's carriage which is designated generally by reference numeral 16. Carriage 16 has forwardly positioned wheels 18 and rearwardly positioned wheels 20 which ride on an angle iron track (not shown) welded to the top of main frame 10.

An operator of the machine may enter the carriage 16 at the rear 22 thereof and walk through the carriage, under a protective overhead canopy 24, to a forwardly positioned turret mounted spray gun 26, the details of construction and operation of which will be described more fully hereinafter.

The carriage 16 is designed to carry a complete supply of raw materials necessary for the production of a fiberglass tank within a forwardly positioned mold designed generally by reference numeral 30. Carriage 16 is large enough to contain, for example, a full pallet of fiberglass roving, several drums of resin binder, several pressurized tanks of catalyst, and a mold release agent which is sprayed on the inside surface of mold 30 at the beginning of the operation. Carriage 16 is also designed to store and carry at the top of the rear portion thereof a pair of aggregate hoppers, designated generally by reference numeral 28, which are raw materials that also may be utilized during the production of the fiberglass tank. The storage, location, positioning, feeding and handling of the raw materials will be described in greater detail hereinafter.

The mold 30 of the preferred embodiment of the present invention includes a generally cylindrical side wall portion having an open end designated generally by reference numeral 38. The other end of mold 30 is closed by a hemispherical portion designated generally by reference numeral 39. The open end 38 of mold 30 has a circular support ring 40 formed thereat which rides on a wheel bearing support system indicated generally by reference numeral 42. The mold 30 is supported at its other end by a drive shaft 32 which is coupled to a motor housed within a motor housing 50. Mold 30 is therefore rotatable about its longitudinal axis, and drive shaft 32 and wheel bearing supports 42 constitute the only means of support of the entire mold 30 to the main frame 10.

The mold 30 is split longitudinally and consists of an upper mold half 34 and a lower mold half 36 which, when joined, form the cylindrical side wall and hemispherical end portion 39 of the mold 30. The upper half 34 and lower half 36 of mold 30 are joined by respective flanges 44 and 46 which are releasably secured together by, for example, nuts and bolts.

A plurality of ribs 48 are formed about the circumference of the cylindrical portion of mold halves 34 and 36 for forming the reinforcement ribs in the finished product, as will be described in greater detail hereinafter. Mold reinforcement rings 49 are also spaced along the cylindrical side wall of the mold, as are longitudinal mold reinforcement beams 292.

The motor housing 50 contains, in addition to the drive motor for mold 30, a motor or motors for reciprocating the carriage 16 along the length of frame 10, as well as many of the auxiliary electrical controls, relays, motors, and the like, for controlling the machine. Motor housing 50 also serves as a support for an overhead gantry crane indicated generally by reference numeral 52.

Crane 52 generally includes a vertical support member 54, a horizontal support member 56 which is pivotable about member 54, and a hoist indicated generally by reference numeral 58 and which is provided for removing the finished product from the mold 30. Hoist 58 is movable along horizontal support member 56, in a manner which will be described in greater detail hereinafter.

A main electrical control panel (not shown) is positioned on the outside rear portion of the operator's carriage 16 to permit control of the operation of the machine from that position. The panel is electrically wired to the controls within motor housing 50 via a cable 60 which feeds underneath the mold 30 up through a tubular guide 62 and is supported by an upper horizontal support bar 64 having sliding guides 66 therein to accommodate movement of the carriage 16.

An additional electrical control panel (not shown) is also provided within the carriage 16 for control by the operator therewithin, and means are preferably provided for permitting control of the machine only from one or the other of the interior and exterior control panels. In addition, a pair of pendants 68 may be provided, if desired, for additional outside control of certain operations of the machine. Pendant 68, as illustrated in FIG. 1, is connected to the outside electrical control panel (not shown) on the rear of carriage 16 via a cable 70 and a horizontal support 72.

Support 72 extends between a pair of vertical posts 74 and 76 which are positioned outside of the main carriage body but are attached thereto so as to move therewith as the carriage reciprocates into and out of the mold 30. A like pair of vertical posts (not shown in this view) are positioned on the other side of carriage 16 and also support the upper horizontal support bar 64 for cable 60. The two pair of vertical posts have lift mechanisms incorporated therein and serve as a means for removing and hoisting the upper mold half 34, in a manner which will be described in greater detail hereinafter.

A pair of exhaust fans, one of which is designated by reference numeral 78, are positioned downwardly and rearwardly of carriage 16. The exhaust fan 78 draws fumes and excess particulate matter from the interior of mold 30 along the direction indicated by the dotted arrows within an exhaust duct 80 which is positioned below frame 10 above floor 12. The sides of duct 80 are covered by skirt members (not shown).

Also illustrated in FIG. 1 is a guard rail 86 which extends along the entire length of both sides of the machine and is connected to the main frame 10. The guard rail 86 is laterally spaced from the side of the machine to define a catwalk 96 along which a worker may walk during the operation of the machine.

A heating unit 84 is also illustrated in FIG. 1 and is pivotally mounted to the opposite side of the motor housing 50. Heating unit 84 preferably comprises a plurality of series-connected infra-red heaters which may be individually controlled so as to heat the desired length of mold 30 prior to or during the application of the raw materials to the inner surface thereof to facilitate curing.

The forward portion of the canopy 24 of the operator's carriage 16 includes a plurality of lights 82 for illuminating the interior of the mold 30. A vertical air curtain is also established about the periphery of the forward portion of canopy 24 in order to protect the operator positioned adjacent the spray gun turret 26 from the fumes and particulate matter within mold 30. The manner of establishing the air curtain will be described in greater detail hereinafter.

A fresh air intake fan (not shown) is also positioned on the top of the rear portion of the carriage 16, and serves to direct a stream of fresh air into the carriage 16.

The basic operation of the preferred embodiment of the machine of the present invention, which embodies the present inventive technique, will now be described in connection with FIGS. 1 through 6. Initially, the necessary raw materials, such as fiberglass roving, catalyst, resin, mold release agent, and the like, are loaded into their appropriate storage positions within carriage 16. The raw materials are appropriately fed to the turret mounted spray gun 26, as well as other applicator devices, as will be described in greater detail hereinafter. An operator, prior to entering the rear 22 of carriage 16, switches on the electrical power, the fresh air intake fan, the exhaust fan 78, and the lights 82 on the canopy 24 of carriage 16. The motor for rotating the mold 30 is also turned on and adjusted to the appropriate speed. The operator then enters the rear 22 of the carriage 16 and makes his way towards the forwardly positioned operator's work area adjacent the spray turret 26. After conducting appropriate system checks, he readies the carriage 16 for its initial pass into the open end 38 of mold 30.

While the mold 30 is rotating, the carriage 16 moves at an appropriate speed into the mold. During this initial pass into the mold, the operator sprays an appropriate mold release agent onto the inside surface of the mold. The mold release agent facilitates the eventual removal of the finished product from the mold.

Figure 2:
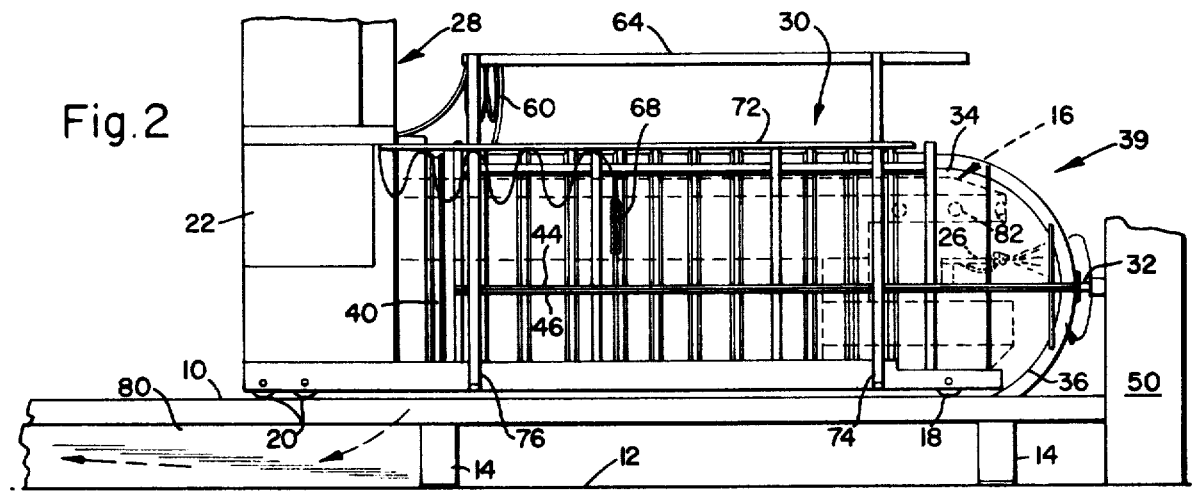
FIG. 2 is a side view of certain of the components illustrated in FIG. 1 wherein the movable carriage is illustrated in dotted outline within the rotating mold.

The final position of the carriage 16 with respect to the mold 30 after the initial pass is illustrated in FIG. 2. Note that the covered operator's carriage 16 is contained completely within the mold 30 but for the rearward most portion thereof, which is designed primarily for containing the raw materials being applied. The mold 30 is rotating at the desired speed and the operator is functioning adjacent the turret mounted spray gun 26 in the designated operator's area in total safety. Lights 82 illuminate the interior surface of the mold, and the air curtain, intake and exhaust fans protect the operator from any intoxicating effects of the fumes and/or particulate matter.

With the carriage 16 in the position illustrated in FIG. 2, and the mold release agent having been applied to the interior surface of the mold 30, application of the initial layer of fiberglass laminate is ready to be initiated. The fiberglass roving, resin and catalyst are all applied through a spray gun mounted on the forward portion of turret 26 which is adapted for movement during use in a horizontal plane only. The operator therefore swivels the turret 26 while mold 30 is rotating in such a fashion so as to cover the hemispherical end portion 39 of the mold 30 with the desired amount of laminate. After the hemispherical cap portion 39 is finished, the operator sets the turret at a right angle to the longitudinal axis of mold 30, and the carriage 16 is set to withdraw slowly from within the mold while the spray gun is actuated. The speed of rotation of the mold 30, the amount of material being sprayed by the gun mounted on turret 26, and the speed of withdrawal of the carriage 16, may all be programmed or pre-established to provide a desired thickness of the initial layer of laminate being applied to the inside surface of the mold 30.

In the preferred technique of the present invention, several additional passes of the carriage 16 are made into and out of the revolving mold 30. For example, after the initial layer of laminate has been applied by slowly withdrawing the carriage 16 from the mold 30, upon the next pass of the carriage 16 into the mold 30, a light aggregate filler is preferably applied from within to fill the ribs 48 of the cylindrical side wall of mold 30. Thus, at the completion of the second pass of the carriage 16 into the mold 30, an initial laminate layer has been complimented by a light aggregate filler located in each of the circumferential ribs 48. The filler serves the dual function of providing additional structural strength and a smooth inner surface for the finished product.

A second layer of fiberglass laminate is then sprayed onto the interior of the mold 30 as the carriage 16 is withdrawn for the second time. As in the first withdrawal, the end cap portion 39 is initially covered by rotating the turret 26 in its horizontal plane, and the cylindrical side wall portion of the mold 30 is covered by fixing the turret at a 90° angle with respect to the axis of mold 30 and slowly withdrawing the carriage 16.

At the completion of the application of the second layer of laminate, the machine is in the state illustrated in FIG. 1, and a third entry may be made by carriage 16 for the purpose of applying a resin-rich mixture over the second laminate layer to provide a smooth interior surface for the end product. At the completion of the third pass into the mold by the carriage 16, the machine elements are again in the position illustrated in FIG. 2, and the mold 30 is permitted to continue to rotate until the raw materials are sufficiently hardened.

Figure 3:
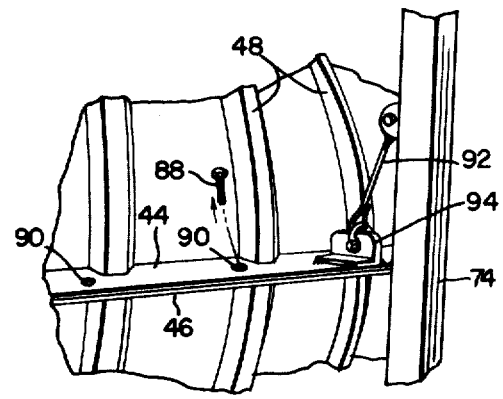
FIG. 3 is an enlarged, broken, perspective view illustrating the manner of attachment of the upper and lower mold halves, as well as the manner of hoisting the upper mold half.

When the finished product has sufficiently hardened, as determined by the operator in the carriage 16, rotation of the mold 30 is halted at a position where the flanges 44 and 46 of the upper and lower mold halves 34 and 36 are in a substantially horizontal plane. At this point, a workman positioned on the exterior of the mold 30 unbolts the upper and lower flanges 44 and 46 by removing bolts 88 from aligned apertures 90, as illustrated in FIG. 3.

Figure 4:
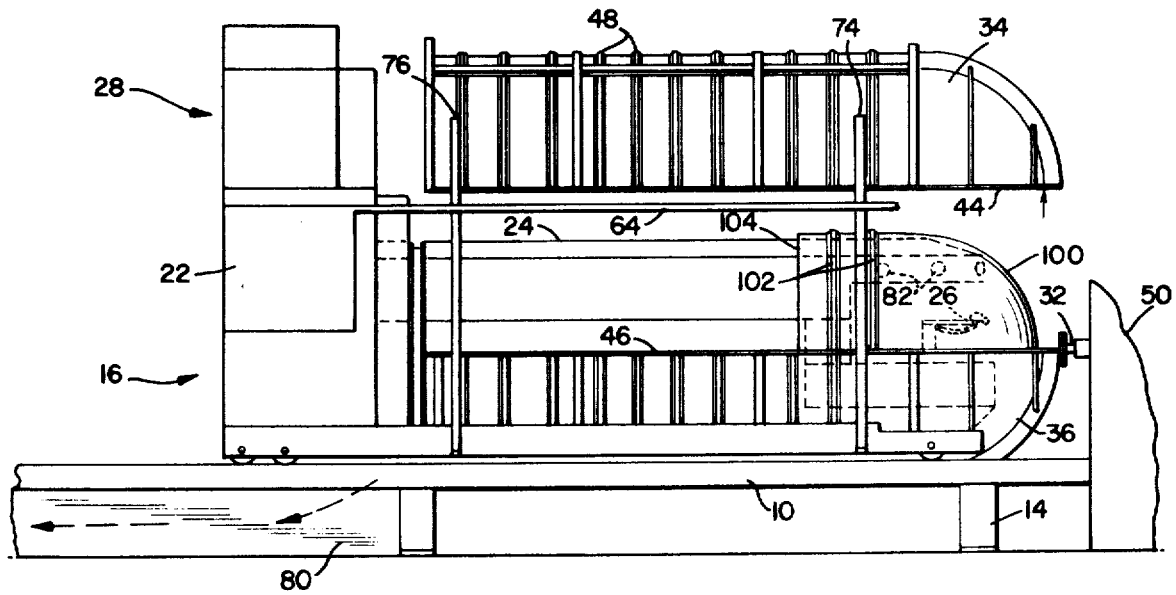
FIG. 4 is a view sequential to that shown in FIG. 2 illustrating the upper half of the mold in a hoisted position after the desired article has been formed.

The vertical posts 74 and 76 are then properly positioned on each side of the mold 30 for attachment of their respective hoist mechanisms 92 to an upstanding bracket 94 on the upper flange 44 of upper mold half 34. The connection of the four hoists 92 is made by the outside workman, who then may actuate the appropriate hoisting motor, perhaps via pendant 68, to lift the upper mold half 34, as illustrated in FIG. 4.

Hoisting of the upper mold half 34 exposes the finished article 100 which remains in position in the lower mold half 36. The finished article 100 comprises one-half of the eventual finished product and consists of a semi-capsule having a hemispherical end cap and a cylindrical side wall which includes an open end 104 and a plurality of reinforcing ribs 102, the latter of which may be filled with the light aggregate filler. As may be appreciated from FIG. 4, the open end 104 of the fiberglass tank half 100 may extend as far down the length of mold 30 as may be desired, in accordance with the desired capacity of the finished product.

The carriage 16 is then backed out of the mold with the upper half 34 of the mold raised thereabove, to the position illustrated in FIG. 5. The hoist 58 of the gantry crane 52 is then positioned over the finished article 100 in the bottom half 36 of the mold. A workman attaches the hoist 58 to the finished article 100 by any conventional means, and the tank half 100 is then hoisted out of the mold and positioned on the side of the machine to await completion of the second half of the tank for joining thereto.

After the product 100 has been removed, the carriage 16 is run back into the mold, the upper half 34 is lowered in place until flanges 44 and 46 abut, and the latter are then resecured. The machine is then ready to make the remaining tank half. The two tank halves 100 and 106 (FIG. 6) may be joined at their junction 98 by manual application of a fiberglass mat, resin and catalyst in a conventional manner.

FIG. 6 indicates the various sizes of tanks which may be constructed with the machine of the present invention. The tank consisting of tank halves 100 and 106 includes a plurality of reinforcing ribs 102 and is approximately eight feet in diameter. The overall length is approximately sixteen feet, and the nominal capacity is approximately 4,000 gallons.

The tank sizes indicated by reference numerals 108, 110, 112 and 114 each have an eight foot diameter and are respectively sized to have a nominal capacity of 6,000, 8,000, 10,000 and 12,000 gallons, respectively. Obviously, the finished product could be made to any desired size.

FIG. 5 is a cross-section of the rib 102 of the tank half 100 of FIG. 6 and illustrates the body laminate 116 and rib laminate 122 which are formed during the initial pass of the carriage 16 out of the mold 30. The aggregate rib filler 118 may comprise, in a best mode, microsized glass bubbles or balls known as "Q-CEL" manufactured by Philadelphia Quartz, and is applied to the rib 102 during the second pass of the carriage into the mold. The final layer of laminate 120 is then applied to retain the rib filler 118 and provide a smooth interior surface.

It should be appreciated by a person of ordinary skill in the art that it is possible to omit some or all of the steps described above in making a satisfactory product for certain uses. For example, it is possible to eliminate the steps of applying the rib filler aggregate and/or the final resin-rich coating. It may be appreciated that a satisfactory product may be manufactured by an initial pass of the carriage into the mold to spray a mold release agent, and a single pass of the carriage out of the mold to apply the desired fiberglass or plastic laminate. Accordingly, the detailed description set forth hereinabove is provided so as to present the best mode presently contemplated for carrying out the invention, but is not intended to be limiting in any manner whatsoever.

A more detailed description of the preferred embodiment of the present invention will now be set forth with reference to FIG. 8 and the various sectional, side, end and top views thereof. Referring more specifically to FIGS. 8, 16, 17 and 18, the structure of the operator's carriage 16 of the present invention is illustrated in greater detail.

It may be appreciated that the right side vertical lifting posts 74 and 76 are complimented by a pair of similar lifting posts 124 and 126 positioned on the left side of carriage 16. The power lifting means within posts 74, 76, 124 and 126 may be electrical, mechanical, hydraulic, or the like. The horizontal support member 64 for the cable 60 is spaced from the vertical posts 124 and 126 by support elements 128 and 130, respectively. The left side of the carriage 16 also has a horizontal pendant support 132 for supporting the left side pendant 134.

Positioned at the rearmost part of the main frame 10 is an exhaust fan housing and support frame 150 within which are positioned a pair of individually actuable exhaust fans 78 and 142 which, as explained above, are adapted to remove the fumes, odors and particulate matter from the mold and carriage via the duct 80 that underlies the frame 10. Suitable filtering elements (not shown) may be provided adjacent fans 78 and 142 for preventing the foreign matter and odors from polluting the ambient air. A pair of separately actuable motors 144 and 146 are positioned adjacent the fans 78 and 142 for powering same.

As seen particularly in FIG. 17, access to the inside of the operator's carriage 16 is via a rear door 152 which preferably includes a window 151 for providing visual access and an emergency exit latch 153 on the inside of door 152 to permit easy exit.

The rear portion of the carriage 16, designated generally in FIGS. 8 and 16 by reference numeral 162, is substantially wider and higher than the middle and forward portions of the carriage and is designed to serve primarily as a raw material storage area.

Extending centrally along the entire length of the carriage 16 is a flooring or walkway 154. The side walls of the carriage at its central portion are designated in FIG. 16 by reference numerals 155 and 157 and are cantilevered from the rear portion 162 of the carriage as by beams 164, which permit the carriage to be inserted into and removed from the mold.

The walkway 154 extends to the forward portion of the carriage which comprises the main workstation for the operator and is defined by left and right side walls 156 and 158 which rise from the flooring to approximately waist level, and a forwardly positioned curved carriage front all 160, which is preferably integrally formed with side walls 156 and 158. It may be appreciated from FIG. 16 that side walls 156 and 158 are somewhat wider than the middle portion side walls 155 and 157.

Referring now primarily to FIGS. 17 and 18, access to the rear raw material storage area 162 of the carriage 16 is preferably by means of a left rear carriage storage door 166 and a right rear carriage storage door 168 which are pivotally mounted to a rear storage area frame 169. On the upper right side of the rear storage area 162 is preferably provided an auxiliary storage compartment 170 which is sized so as to permit a full pallet of fiberglass roving to be stored therein. Storage compartment 170 preferably includes its own access door for easy loading.

On the left side of the rear storage area 162 is mounted the main outside electrical control panel 172 to which the cable connects via connector 61. On the end of the control panel 172 are mounted a plurality of control buttons and/or switches 174, which will be described in greater detail hereinafter. A warning bell 173 is mounted on the control panel 172 and is wired so as to be sounded prior to the initiation of rotation of the mold 30.

Mounted on top of the rear frame 169 are a pair of hoppers 136 and 138 between which is positioned a shroud 140 for a large, low pressure air intake fan 141. Fan 141 is driven by a motor 143 and cooperates with the exhaust fans 78 and 142 to create a continuous flow of fresh air within the carriage 16 at all times. The flow of air, generally speaking, is down through the fan 141, through the main carriage 16, over the front wall 160 of the carriage through the mold (if the carriage is in the mold) and back out through the exhaust duct 80 and fans 78 and 142.

The light aggregate in hopper 138 which, as described above, may consist of small plastic pellets or the like, feeds down through a tube 176 to a measuring and air pressurizing device 178. Device 178 may consist of an auger meter for controlling the rate of feed of the light aggregate, and an air venturi system to propel the aggregate forwardly in feed tube 180 which feeds forwardly to the turret 26 at the forward portion of the carriage. Controls 179 may be provided for setting the speed of the auger, the flow of the air to the venturi, and the like.

A relatively heavy aggregate, such as for example sand, may be provided in hopper 136, and may include its own metering and feed forward system so as to permit the heavy aggregate to be admixed with the laminate, if desired. The admixture of a heavy aggregate, such as sand, provides a more dense laminate, helps the glass roving to lie down better, keeps it from slipping, provides a more uniform appearance, and helps to prevent wicking of the fiberglass fibers. The heavy aggregate in hopper 136 is lowered via a neck 182 and a metering orifice 183 and is fed forwardly to the operator's station in the front of the carriage by an auger 184 positioned in a feed tube 185. The auger 184 is driven by a motor 186 which may be bolted to the underside of the roof of the rear housing 169 and is coupled to the auger via a chain drive 188.

Also located in the raw materials storage section 162 of the carriage 16 is a container 190 for housing a mold release agent such as, for example, PVA (Polyvinylalcohol). The mold release agent in container 190 is fed via a hose 192 to the forward portion of the carriage. More particularly, hose 192 extends underneath the walkway 154 (see FIG. 16) which branches off near the forward portion of the carriage to a separate spray gun 205 positioned on the side wall 156 of carriage 16. A separate spray gun 205 is provided for the mold release agent since the latter need not be metered nearly as carefully as the resin, catalyst and roving, as is accomplished by the turret mounted spray gun 26, to be described in greater detail hereinafter.

Also positioned in the material storage area 162 of carriage 16 is at least one drum 194 having a polyester resin binder, such as for example an isothalic polyester. Room is provided in the storage area 162 for preferably four such resin drums, each having its own heater to maintain the temperature of the resin at a predetermined level, for example 82° F., which optimizes its applicability and effectiveness. The drum 194 is mounted on caster wheels 196 to facilitate the loading and unloading thereof. A pump 198 is provided for pumping the resin in the drum 194 via a conduit 200. Extending from the drum 194 is a resin feed line 202 which extends underneath the walkway 154 of the carriage (see FIG. 16) to the turret mounted spray gun assembly 26 positioned in the forward operator's work area thereof. A return line 203 also extends between the material storage area 162 and the turret 26 for recirculating the resin when it is not being used in order to maintain the resin at the desired temperature. The recirculation may be controlled by a valve positioned in the turret, which will be described in greater detail hereinafter.

Also mounted on the top of the rear portion of the carriage, just forwardly of the fresh air intake fan 141, is a high pressure fan 204 for establishing an air curtain about the operator's area in the forward portion of the carriage. The fan 204 communicates with a U-shaped aperture 211 formed in the forward edge of the overhead canopy 24 about the periphery thereof (see FIG. 19) via triangularly shaped ducts 207, 209 formed in the canopy 24 of the carriage 16. The air curtain established by the high pressure downward flow of air through U-shaped aperture 211 extends between the canopy 24 and the side walls 156, 158 and 160 of the forward portion of the carriage and effectively provides a barrier between the fumes and particulate matter being ejected by the chopper and spray gun on the end of the turret 26 and the operator standing under the canopy. Although the materials utilized in the preferred mode of practicing the present invention are not necessarily toxic, their fumes can be slightly intoxicating, and the air curtain serves, in combination with the intake and exhaust fans, to protect the operator from possible harmful side effects.

In FIGS. 8 and 16, reference numeral 206 refers generally to an air control tree which includes various valves, meters, gauges, interconnecting pipes, and the like, to control the various air pressures and conduits necessary to operate the chopper gun and spray assemblies of the carriage. Air tree 206 provides direct and immediate access and careful control by the operator of all air pressures and flows which operate the resin, catalyst and mold release spray systems, as well as the chopper gun air motor. Extending from the air tree 206 are outlet lines 208 which branch underneath the central walkway 154 to the turret assembly 26.

Positioned on the opposite wall 157 of the carriage 16 are a pair of pressurized tanks 210 and 212 which contain a conventional catalyst, such as for example methylethylketone (MEK) which is fed to the turret assembly 26 via an outlet conduit 220. Means are provided on the air tree 206 for switching from one catalyst tank to the other, which are pressurized by way of overhead air conduits 218.

Figure 19:
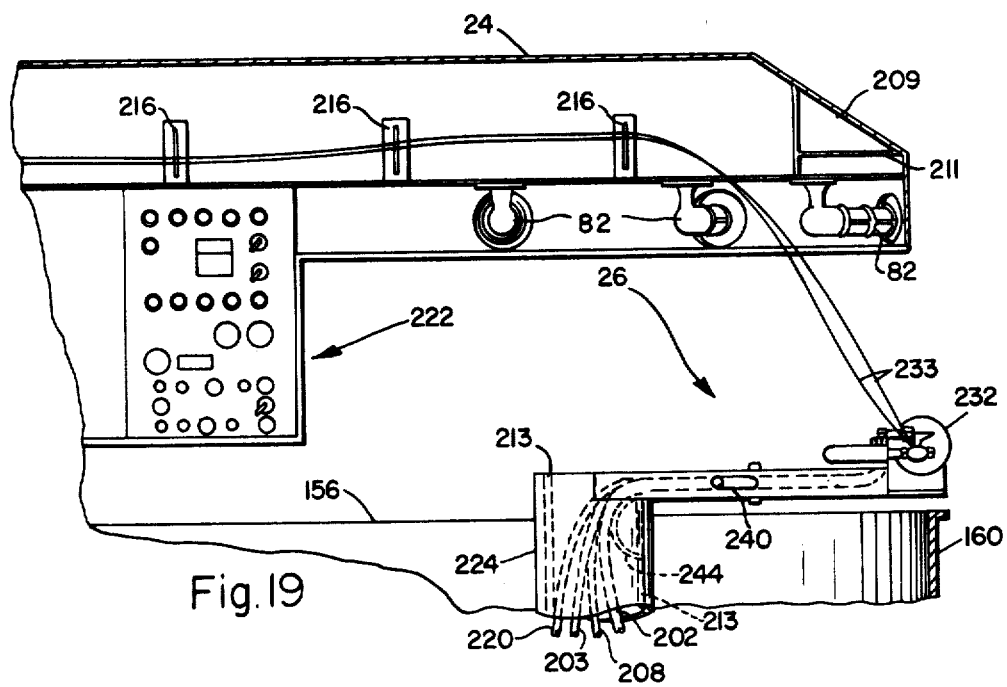
FIG. 19 is an enlarged, partially sectional, broken view which illustrates the structure of the operator's work area in the forward portion of the carriage of the present invention.

Referring now to FIG. 19, the forward portion of the carriage which comprises the main operator's work area includes a plurality of roving eyelets 216 for feeding the fiberglass roving to the chopper gun mounted on the end of the turret assembly 26. Reference numeral 222 indicates generally the interior control panel consisting of various switches and meters, to be described in greater detail hereinafter, by means of which the operator in the carriage may control the entire operation of the machine. Shown in FIG. 19 are the plurality of overhead lights 82 which extend through the canopy 24 to illuminate the interior of the mold. Lights 82 are preferably vapor-proof and shielded.

As illustrated in FIGS. 19 through 22, the turret 26 comprises a substantially hollow vertical pipe 213 which is fixed to the central forward portion of the walkway 154 of the carriage 16. Extending upwardly from underneath the walkway 154 through the hollow posts 224 and 213 are the resin feed line 202, the resin return line 203, and the catalyst feed line 220, along with an air hose 208 and, if desired, the light aggregate feeder hose 180. The aforementioned hoses extend up through post 224 and 213 to a horizontally disposed support bracket 226 which is pivotable about the vertical axis of post 213. A semicircular pipe section 244 is provided adjacent the junction of post 224 and bracket 226 to prevent the various hoses and pipes from becoming kinked, or the like.

At the free end of horizontal support bracket 226, which is constrained in rotational movement to a horizontal plane, are several spray assemblies and a fiberglass roving chopper gun. More particularly, a chopper gun is provided for chopping the fiberglass roving 233 into small, one to two inch long pieces. The chopper gun is operated by an air driven cutter motor 232 which is fed via an air hose 236. A knob 228 is provided on the side of the horizontal support bracket 226 for controlling the speed of the air driven cutter motor 232 by controlling the amount of air through line 208. The cutter motor, supported by an adjustable bracket 225, conventionally comprises a pair of rubber rollers indicated generally by reference numeral 231, one having a plurality of razor-sharp blades positioned radially thereabout, the other of which is an anvil roller that abuts the circumference of the first roller so that when the fiberglass roving 233 is run between the rollers, the latter chops the fiberglass into short pieces.

As shown schematically in FIG. 22, the chopped fiberglass roving is fed out between upper and lower resin spray nozzles 235 and 237. The resin sprays from nozzles 235 and 237 are designed to converge at the surface of the mold. Also positioned between the two resin spray nozzles is an additional spray nozzle 239 for applying the catalyst. The spray from nozzle 239 is also designed to converge at or adjacent the mold wall. In a preferred mode, the resin sprays from nozzles 235 and 237 are applied via an air-operated pump, while the catalyst spray from nozzle 239 is atomized upon application by an air supply 243. Since the resin-catalyst ratio is approximately 100:1, it may be appreciated that the amount and atomization of the catalyst need be carefully controlled.

Reference numerals 234 and 214, respectively, indicate upper and lower resin supply hoses which extend from a resin valve 245 to resin nozzles 235 and 237, while reference numerals 242 indicates a catalyst supply hose which extends from a catalyst valve 247 to the catalyst nozzle 239. A pair of levers 238 and 239 are respectively provided for turning on and off the cutter motor 232 via an air valve 249 and the resin and catalyst spray nozzles 235, 237 and 239 via valves 245 and 247. Additionally, a lever 240 is provided adjacent the horizontal support bracket 226 for selecting either the application of the resin through line 202 to the valve 245 and the two resin spray nozzles 235 and 237, or the recirculation of the resin back through line 203 to maintain the resin at the desired temperature.

Figure 20:
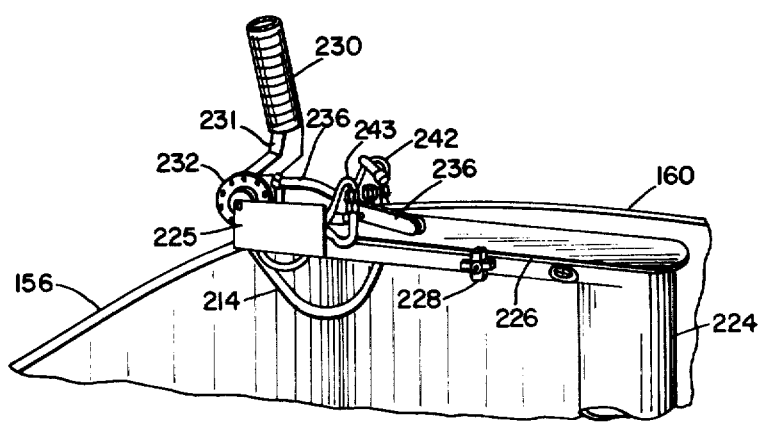
FIG. 20 is a perspective, partial view which illustrates the turret post and associated machines for applying the raw materials to the mold of the present invention.

As illustrated in FIG. 20, the heavy aggregate feeder hose 230 may terminate at a position adjacent the chopper gun-spray system on the end of horizontal support bracket 226 for providing easy admixture of the heavy aggregate with the resin-catalyst-fiberglass laminate as it is being applied. A support funnel 231 may be conveniently provided for permitting hand held operation of the feeder hose 230, as desired. Additionally, a light aggregate applicator 241 may also be provided (see FIG. 22). The horizontal support bracket 226 and/or side bracket 225 are preferably horizontally adjustable towards and away from the mold wall to provide optimum adjustment capability.

The air operated chopper-spray system set forth above is, in a best mode, capable of outputting approximately 37 pounds of fiberglass laminate per minute at a pump pressure of between 400 and 1,200 pounds. As stated above, the horizontal support bracket 226 is pivoted by the operator about the front wall 160 of the carriage when the hemispherical end portion of of the tank is being formed, but is fixed at a 90° angle to the axis of the mold while the carriage is being withdrawn when the cylindrical side wall portion is being formed.

Referring now to FIG. 15, the structure which comprises the entranceway to the mold 30 will now be described. Extending between the main frame members 10 is a cross beam support member 246 from the sides of which upwardly extend left and right side support members 256 and 258. An upper transverse support member 260 extends across the top of side support members 256 and 258. Connected to the cross beam support and side support members are left and right lower mold rings 248 and 250, while a left and a right upper mold ring 252 and 254, respectively, are connected to the side support members 256 and 258 and upper transverse support 260.

A pair of mold entrance gates 262 and 264 are pivotally mounted to the side frames 256 and 258, and a pair of rubber entrance flaps 266 and 268 extend inwardly from the entrance gates to provide a seal when the carriage, indicated in dotted outline by reference letter C, is extended within the mold.

Referring now to FIG. 14, the wheel bearing support system of the present invention is seen to comprise a pair of substantially identical wheel bearing assemblies 42 each of which includes a leveling plate 270 which is welded to a diagonal frame member 272 which, in turn, extends between the main frame 10 and the cross beam support 246. A wheel mounting bracket 274 is bolted to leveling plate 270 and has a center post 276 extending vertically therefrom at an angle to the center line of the mold of approximately 45° with respect to a vertical plane through said center line. A control shaft 278 extends through the upper portion of center post 276 and permits a bearing mounting plate 280 mounted thereon to pivot. Pivotally mounted on the respective ends of the bearing mounting plate 280 are two wheel pairs 282 and 284 which are preferably made of rubber and contact the circular mold support ring 40. The identical wheel bearing support assemblies 42, along with the drive shaft 32, provide the only means of support for the entire mold 30 on the main frame 10.

The mold 30 of the preferred embodiment of the present invention preferably includes, as perhaps best viewed in FIG. 12, a plurality of longitudinally extending, mold-reinforcing beams or brackets 286, 288, 290 and 292. As seen in FIGS. 10 and 11, on the hemispherical end portion 39 of the mold 30 are positioned a pair of annular support flanges 294 and 296, as well as a pair of longitudinal support flanges 298 and 300. The mold 30 is preferably constructed of rolled steel for long life, accuracy and repeatability.

Referring now to FIGS. 8, 9 and 10, the motor house 50 is illustrated and is preferably constructed of extra heavy duty steel so as to provide adequate support for the overhead gantry crane 52 as well.

The motor house 50 includes a pair of side frames 302 and 304, a top frame 306, and a bottom frame member 308 which extends between the main frame 10. A pair of rear bi-fold doors 310 provide access to the interior of motor house 50 within which is housed a mold drive motor 314 for rotating shaft 32 and, hence, mold 30. Drive motor 314 is preferably a variable speed D.C. motor, of approximately 10 horsepower, and is coupled via drive belt 318 to a transmission 316 for driving the shaft 32. An auxiliary cooling fan 312 is positioned adjacent motor 314.

Also housed within motor housing 50 is a drive motor 356 for the operator's carriage 16. Drive motor 356 preferably comprises a variable speed D.C. motor, similar to motor 314, or may alternatively comprise a pair of constant speed motors, one for a fast speed and one for a slow speed, which may be coupled by an appropriate differential transmission. Motor 356 is coupled to a drive shaft 358 via coupler 357. As illustrated schematically in FIG. 23, drive shaft 358 extends within the main frame 10 and includes a screw-threaded portion 360 at its distal end which runs substantially the entire length of carriage 16. Positioned in the rear portion 162 of carriage 16 at the lower portion thereof is a threaded keeper 362 which mates with the screw 360 in such a fashion that rotation of shaft 358 causes carriage 16 to reciprocate into or out of the mold. Obviously, the drive system just described is only one of a number of suitable systems which could be employed with the present invention. For example, a chain and sprocket drive could also be employed.

Also positioned within motor house 50 are the control relays 324 and the like for controlling the various electrical functions of the machine of the present invention. An external electrical panel 320 is provided and has an outlet cable 322.

As seen in FIG. 10, the drive shaft 32 is supported by a bearing 350 coupled to the rear of the motor house and terminates in a bearing plate 352. Bearing plate 352 is coupled to a like bearing plate 354 which is connected only to the lower mold half 36, so that when the upper mold half 34 is hoisted, the drive shaft 32 and bearing plate assembly 352, 354 remains stationary.

As perhaps best illustrated in FIGS. 8 through 10, mounted on the top frame member 306 of the motor house 50 is a main support column 326 of the gantry crane 52 of the present invention. Support column 326 has a base plate 328 which is bolted to the top of motor house 50 via bolts 330. Vertical support 54 extends upwardly from main column 326 and includes an aperture formed in the top portion thereof for receiving a pivot pin 336 that extends downwardly from the bottom of horizontal support member 56 through a bearing assembly 338. A skirt 332 is also provided to pivot about the vertical support 54, and a cam roller assembly 334 is provided between the inside surface of skirt 332 and the outside surface of vertical support 54 to facilitate rotation of horizontal support 56.

The hoist 58, which may be either air or electrically operated, includes a trolley-like roller assembly 340 for movement along the I-beam 56. A hook 342 is positioned at the bottom of a cable 344 operated by a motor 346. The horizontal support member or I-beam 56 preferably includes an additional reinforcing top support member 348.

Figure 24:
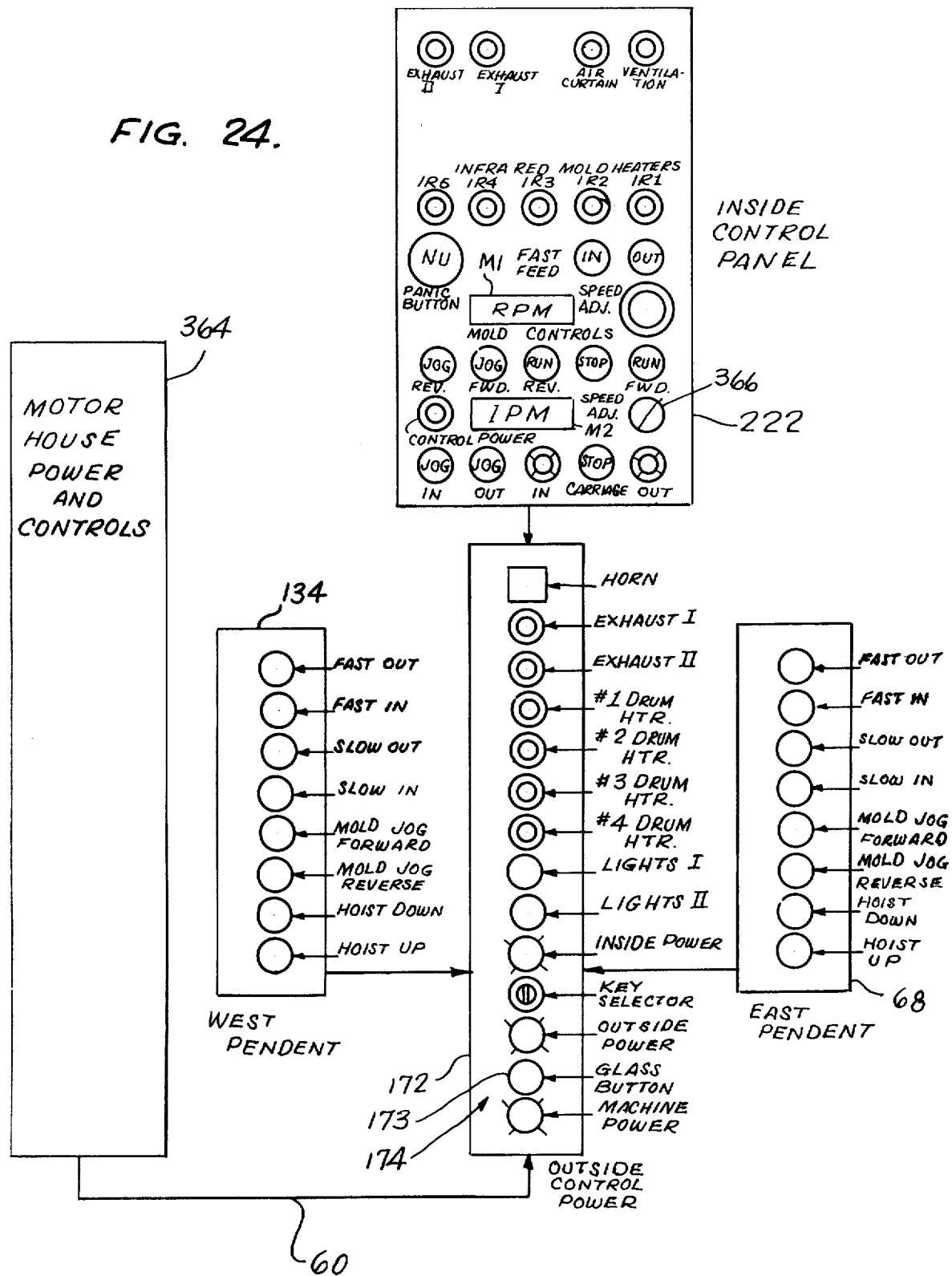
FIG. 24 is a block diagram which schematically illustrates the electrical control panels and their interconnection for controlling the machine of the present invention.

Referring now to FIG. 24, there is illustrated an electrical block diagram which shows the various control switches, indicator lamps and meters which together control the operation of the preferred embodiment of the present invention. Reference numeral 364 indicates the motors and control relays and the like located within the motor house 50 which are connected to the main outside control panel 172 on the rear of the operator's carriage 16. Also illustrated in FIG. 24 are the east pendant 68 and the west pendant 134 which are also electrically coupled to the main outside control panel 172. Finally, the inside control panel 222 is also illustrated and is electrically coupled to the main outside control panel 172.

Referring first to the inside control panel 222, it is seen to include a first row of switches for controlling the two exhaust fans 78 and 142, the air curtain fan 204, and the air intake or ventilation fan 141. The second row of switches consists of five individual switches for controlling adjacent segments of the infra-red mold heater 84. As pointed out above, the heater 84 is preferably divided into a plurality of individual segments which may be individually actuated to heat only that portion of the mold corresponding to the size of tank being produced.

The inside control panel 222 also includes a "panic button" which serves, when actuated, to sound a battery operated siren and turn on a battery operated lighting system. Adjacent the "panic button" on inside control panel 222 are "in" and "out" buttons for a "fast feed" control for the carriage 16. These may be provided in the event that two constant speed motors are provided for reciprocating the carriage into and out of the mold. The slow speed controls for moving "in" and "out" of the mold, as well as a "stop" control, for the carriage are located in the lower right hand corner of inside control panel 222.

A digital meter M1 is positioned on inside control panel 222 for providing a direct read out of the revolutions per minute of the mold 30. Positioned below meter M1 are five mold control switches. The three switches on the right hand side respectively run the mold in reverse, stop the mold, and run the mold forwardly, at a speed which may be adjusted by speed adjustment 366 and which is indicated by meter M1. To the left of those three switches are "jog forward" and "jog reverse" switches which are momentary contact switches which rotate the mold only so long as the switches are depressed. The latter two switches are utilized for aligning the flanges of the mold to be precisely horizontal prior to removing the upper mold half, and the like.

Below the mold control switches is a second meter M2 which is a digital readout meter that indicates the inches per minute at which the carriage 16 is moving. To the left of meter M2 is a control power switch which includes a center indicator light which lights up to indicate the presence of power to the inside control panel 222.

The lower row of switches, in addition to the carriage control described above, include a "jog in" and "jog out" control for the carriage which are also momentary contact switches which actuate the carriage motor or motors only when depressed. Clearly, the two-speed motors could be replaced by a single variable speed motor and corresponding speed adjustment for the carriage, as described in connection with the mold.

The outside main control panel 172 includes a series of switches and controls 174 which include, from top to bottom, a "horn" switch which tests the operation of a horn. The horn automatically sounds prior to the movement of the carriage either into or out of the mold. Below the horn switch are a pair of switches for controlling the exhaust fans so that they may be turned on prior to the operator entering the carriage 16. A series of four drum heater switches follow, which individually actuate four resin drum heaters located in the rear storage area of the carriage. Below the resin drum heater switches are positioned a pair of light switches for respectively actuating lights inside the carriage and in front of the carriage (lights 82).

Below the light switches on the main control panel 172 is an "inside power" indicator which lights when control power is in the inside control panel 222. A "key selector" is positioned below the power indicator lamp and is provided to enable selection of power either to the inside control panel 22, the outside control panel 172, or off. Below the key selector is an indicator light for indicating the availability of control and power at the outside panel 172.

Since control power will be available only to either the inside or outside panels, a provision is made on the outside panel 172 for an emergency power transfer switch which is actuated by breaking a glass button 173. If, for any reason, a workman on the outside of the machine senses an emergency, and it is necessary for him to regain control from the inside control panel 222, he merely breaks the glass button 173.

The "machine power" lamp is lit when the master power switch is tripped to indicate the availability of power to either of the panels.

The controls on each of the pendants 68 and 134 are identical, and duplicate certain of the controls from the inside control panel 222. From top to bottom, they include fast and slow, in and out switches for the carriage, forward and reverse mold switches to enable an outside operator to align the horizontal flanges of the mold prior to separating the mold halves, and down and up hoist switches to actuate the hoists in the four vertical posts on both sides of the carriage after the hoisting connections have been made. It may be desirable to attach the controls of the pendants 68 and 134 to the outside of the motor housing 50, as an alternative to the pendant style as set forth above.

It is seen that by virtue of the foregoing I have provided a unique, completely self-contained machine for constructing large fiberglass structures, such as underground liquid storage fiberglass tanks and the like. The machine is self-contained in the sense that the only things required in addition to the apparatus set forth above are a source of electricity and a source of air. The machine is particularly designed to be easily transported, and may be loaded with sufficient raw materials to construct many finished articles. The mold itself, being constructed of steel, has an infinite life, as do many of the man-fashioned wheels, housings, bearings, and the like, therefore requiring minimum maintenance. Finally, and importantly, the present invention provides a technique for constructing a finished article which permits the workers and operators of the machine to work in a healthy, contaminant-free, safe environment. Noxious exhaust fumes and particulate matter are filtered out of the air, and the operator in the carriage is protected on all sides by an air curtain barrier. The machine affords a manner of carrying the raw materials and the operator into the revolving mold in complete safety by virtue of the lights, fresh air intake and exhaust systems, air curtain systems, and filtering systems. Fingertip control is provided for the operator inside the carriage, and the overhead canopy protects the operator against accidental power stoppage while the carriage is in the mold. The machine may be run from either an internal or external control panel so as to prevent possible injury, and includes siren, horn and bell alarm systems for maximum safety. The horn honks for five seconds or so before the carriage moves in any direction as a warning to those who may be in its way, while the bell is triggered each time prior to rotation of the mold. There may further be provided limit switches on the carriage track for limiting the carriage travel and automatically shutting off power. The forward end of the carriage is designed in particular with regard to the hemispherical shape of the closed end of the mold to provide maximum insertion while still permitting the operator working room.

Obviously, numerous modifications and variations of the present invention are possible in light of the above teachings. It is therefore to be understood that within the scope of the appended claims, the invention may be practiced otherwise than as specifically described herein.

I claim as my invention:

1. In a method of making a large fiberglass structure, the steps comprising:
    passing an operator's carriage into and out of a mold having an open end and a closed end;
    applying raw materials comprising resin and glass fibers to the inside surface of said mold during certain of the passages of said carriage therethrough; and
    manually controlling certain operations of said carriage from inside said carriage.

2. The method as set forth in claim 1, further comprising the steps of:
    separating the upper half of said mold from its lower half after the raw materials have been applied and allowed to harden;
    hoisting said upper half of said mold on top of said carriage; and
    withdrawing said carriage from the lower half of said mold with said upper half hoisted thereover.

3. The method as set forth in claim 2, further comprising the steps of:
    removing the finished article from said lower half of said mold;
    passing said carriage back into said lower mold half;
    lowering said upper mold half back down into engagement with said lower mold half; and
    securing said upper and lower mold halves together.

4. The method as set forth in claim 3, further comprising the steps of:
    repeating the steps recited in claims 1, 2 and 3; and
    joining together the two finished articles.

5. The method as set forth in claim 1, further comprising the steps of:
    affixing means for applying said raw materials to the front end of said operator's carriage so as to enable movement thereof in a horizontal plane; and
    rotating said mold about its longitudinal axis while said raw materials are being applied.

6. The method as set forth in claim 5, wherein said mold includes a substantially cylindrical portion with said open end and wherein said closed end comprises a substantially hemispherical portion, and further comprising the steps of:
    rotating said means for applying raw materials in said horizontal plane when covering said hemispherical portion; and
    fixing said means for applying raw materials perpendicularly to the axis of said mold when covering said substantially cylindrical portion.

7. The method as set forth in claim 5, further comprising the steps of:
    spraying a mold release agent on the inner surface of said mold during the first pass of said carriage therein; and
    spraying a mixture of resin, catalyst and chopped fiberglass roving on the inner surface of said mold during the first withdrawal of said carriage therefrom.

8. The method as set forth in claim 7, further comprising the steps of:
    spraying a light aggregate material into a plurality of ribs formed in said mold during the second pass of said carriage therein; and
    spraying a mixture of resin, catalyst and chopped fiberglass roving on the inner surface of said mold during the second withdrawal of said carriage therefrom.

9. The method as set forth in claim 8, further comprising the steps of:
    spraying a resin rich coating on said inner surface of said mold during the third pass of said carriage therein; and
    rotating said mold with said carriage fully inserted until said raw materials are sufficiently hardened.

10. The method as set forth in claim 9, further comprising the steps of:
    separating the upper half of said mold from its lower half;
    hoisting said upper half of said mold on top of said carriage; and
    withdrawing said carriage from the lower half of said mold with said upper half hoisted thereover.

11. The method as set forth in claim 10, further comprising the steps of:
    removing the finished article from said lower half of said mold;
    passing said carriage back into said lower mold half;
    lowering said upper mold half back down into engagement with said lower mold half; and
    securing said upper and lower mold halves together.

12. The method as set forth in claim 11, further comprising the steps of:
    repeating the steps recited in claims 7 through 11; and
    joining together the two finished articles at their open ends to form a substantially enclosed large fiberglass tank.

13. In a method of making a large fiberglass structure the steps comprising:
    passing an operator's carriage into and out of a mold having an open end and a closed end;
    applying raw materials including resin and fiberglass to the inside surface of said mold during certain of the passages of said carriage therethrough;
    circulating fresh air into said operator's carriage; and
    exhausting fumes from said mold.

14. In a method of making a large fiberglass structure, the steps comprising:
    passing an operator's carriage into and out of a mold having an open end and a closed end;
    applying raw materials comprising resin and fiberglass to the inside surface of said mold during certain of the passages of said carriage therethrough; and
    establishing a substantially vertical high pressure air curtain around the operators station in the forward portion of said operator's carriage.

* * * * *